(12) United States Patent
Nishikawa

(10) Patent No.: US 6,304,384 B1
(45) Date of Patent: Oct. 16, 2001

(54) OPTICAL SUBSTRATE, A MANUFACTURING METHOD THEREFOR, AND A DISPLAY DEVICE USING THE SAME

(75) Inventor: Takao Nishikawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/422,834

(22) Filed: Oct. 21, 1999

(30) Foreign Application Priority Data

Oct. 23, 1998 (JP) .................................................. 10-320007

(51) Int. Cl.⁷ .............................. G02B 27/10; G02B 5/22; B05D 5/06; G03F 9/00
(52) U.S. Cl. ........................ 359/619; 359/891; 427/162; 430/7
(58) Field of Search ..................................... 359/619, 620, 359/891; 349/104, 106; 427/162, 165, 514; 430/7

(56) References Cited

U.S. PATENT DOCUMENTS 6,025,898 * 2/2000 Kashikawa et al. .................. 349/106
6,201,292 * 3/2001 Ormond et al. ...................... 257/667

FOREIGN PATENT DOCUMENTS 62-56901-A * 3/1987 (JP) ................................. G02B/5/20
3-198003    8/1991 (JP) .............................. G02B/103/00
9-258016-A * 10/1997 (JP) ................................. G02B/5/20
10-206623-A * 8/1998 (JP) ................................. G02B/5/20

* cited by examiner

Primary Examiner—Ricky Mack

(57) ABSTRACT

An optical substrate for improving contrast in a display device can be easily manufactured. A first step forms a light transmitting layer 30 by pressing tightly together, with a light transmitting layer precursor 32 disposed therebetween, a first master 10 having a plurality of first raised parts 18 dividing a plurality of areas, and a second master 20 having a plurality of second raised parts 28 divided by a plurality of channels 27. The light transmitting layer 30 has a plurality of light shield recesses 38 transferred from a surface profile of the first raised parts 18, and a plurality of color recesses 36 transferred from a surface profile of the second raised parts 28. A second step separates the first master 10 from the light transmitting layer 30. A third step forms a light shield layer 60 by forming, at least around openings to the light shield recesses 38, a top layer 56 for repelling a light shield material 62, and filling the light shield material 62 into the light shield recesses 38. A next step separates the second master 20 from the light transmitting layer 30. Another step forms a color pattern layer 40 by filling the color recesses 36 with a color material 42.

21 Claims, 18 Drawing Sheets

OPTICAL SUBSTRATE, A MANUFACTURING METHOD THEREFOR, AND A DISPLAY DEVICE USING THE SAME

BACKGROUND OF THE INVENTION

1. Field of the Invention

The present invention relates to an optical substrate, a manufacturing method therefor, and a display device using the same.

2. Description of the Related Art

One known method for manufacturing a color filter used in a liquid crystal display (LCD), for example, involves filling recesses in a light transmitting layer with a color material. This light transmitting layer can be easily produced by producing a master with a desirably patterned surface, depositing resin on the patterned surface of the master, and then curing and removing the resin to obtain the light transmitting layer.

As taught in Japanese Unexamined Patent Application Publication (kokai) 3-198003 (1991-198003), a manufacturing method for a microlens array used in an LCD can be similarly manufactured by depositing resin on a master having concave surfaces corresponding to the lenses. This resin layer is then cured to form a light transmitting layer, and then the resin is removed to obtain the microlens array.

It is important to note, however, that neither of these methods provides for improving contrast between pixels in a displayed image.

OBJECTS OF THE INVENTION

Therefore, it is an object of the present invention to overcome the aforementioned problems.

With consideration for this problem, therefore, an object of the present With consideration for this problem, therefore, an object of the present invention is to provide a method for easily manufacturing an optical substrate for improving contrast.

The invention further relates to an optical substrate obtained by this manufacturing method, and to a display device in which the obtained optical substrate is used.

SUMMARY OF THE INVENTION

To achieve the aforementioned objects, a manufacturing method for an optical substrate according to the present invention comprises a step for manufacturing a light transmitting layer by pressing tightly together, with a light transmitting layer precursor disposed therebetween, a first master having a plurality of first raised parts dividing a plurality of areas, and a second master having a plurality of second raised parts divided by a plurality of channels. The light transmitting layer thus has a plurality of light shield recesses transferred from a surface profile of the first raised parts, and a plurality of color recesses transferred from a surface profile of the second raised parts. A next step separates the first master from the light transmitting layer. A further step forms a light shield layer by forming at least around openings in the light shield recesses, a layer for repelling a light shield material, and filling the light shield material into the light shield recesses. A further step separates the second master from the light transmitting layer; and a further step forms a color pattern layer by filling a color material into the color recesses.

With this method of the present invention light shield recesses are formed in a light transmitting layer precursor by using the first raised parts (i.e. projections) of the first master as a mold. Color recesses are similarly formed opposite the light shield recesses using the second raised parts (i.e. projections) of the second master as a mold. The light shield recesses are then filled with a light shield material, and the color recesses are filled with a color material. The color material thus forms a color pattern layer, and the light shield material forms a light shield layer. This light shield layer becomes a black matrix. The resulting optical substrate can thus be used as a color filter.

Deformation and voids do not occur in the color material and light shield material because these are simply filled into corresponding recesses and are not separated from the master.

In addition, the masters can be reused multiple times insofar as their durability allows once they are manufactured. Steps for manufacturing the masters in this case can be omitted from the manufacturing process used for second and subsequent color filters, thereby reducing the number of manufacturing steps and contributing to cost reduction.

A top layer that repels the light shield material is also formed at least around the opening to each light shield recess in this exemplary method of the present invention. When the light shield material is then filled into the light shield recesses, this top layer makes it difficult for the light shield material to adhere and remain anywhere other than inside the light shield recesses.

The lines of the black matrix used in a high resolution color filter are extremely fine, and the light shield recesses for forming the black matrix are extremely small. The top layer formed around the openings into the light shield recesses in the present invention, however, enables the light shield material to be filled into the light shield recesses without protruding from and remaining around the recesses. As a result, it is possible using this method of the present invention to manufacture a high precision color filter.

The present invention further relates to an optical substrate manufacturing method comprising a step for manufacturing a light transmitting layer by pressing tightly together, with a light transmitting layer precursor disposed therebetween, a first master having a plurality of raised parts dividing a plurality of areas, and a second master having a plurality of curved parts. This light transmitting layer has a plurality of light shield recesses transferred from a surface profile of the raised parts, and a plurality of lenses transferred from a surface profile of the curved parts. Further steps include: a step for separating the first master from the light transmitting layer; and a step for forming a light shield layer by forming, at least around an opening into the light shield recesses, a layer for repelling a light shield material, and filling said light shield material into the light shield recesses.

With this method of the invention first and second masters are combined with a light transmitting layer precursor therebetween to form lenses transferred from the curved parts of the second master. It is therefore possible to easily manufacture an optical substrate as a microlens array having a plurality of lenses. Screen brightness can also be improved because incident light is converged by each lens.

Light shield recesses are also transferred into this optical substrate from the raised parts of the first master, and are then filled with a light shield material. This light shield material forms a light shield layer, which becomes a black matrix. The light shield layer can thus improve contrast between pixels.

It is therefore possible to easily manufacture, by a transfer molding process, a microlens array whereby both a bright display can be achieved and contrast can be improved.

In addition, the masters can be reused multiple times insofar as their durability allows once they are manufactured. Steps for manufacturing the masters in this case can be omitted from the manufacturing process used for second and subsequent microlens arrays, thereby reducing the number of manufacturing steps and contributing to cost reduction.

A top layer that repels the light shield material is also formed at least around the opening to each light shield recess in this exemplary method of the present invention. When the light shield material is then filled into the light shield recesses, this top layer makes it difficult for the light shield material to adhere and remain anywhere other than inside the light shield recesses.

When the resulting microlens array is used with a LCD panel requiring high resolution, the lines of the black matrix are extremely fine. The light shield recesses for forming the black matrix are therefore extremely small. The top layer formed around the openings to the light shield recesses in the present invention, however, enables the light shield material to be filled into the light shield recesses without protruding from and remaining around the recesses. As a result, it is possible using this method of the present invention to manufacture a microlens array that can be used in a high resolution LCD panel or other type of display panel.

The present invention further relates to an optical substrate manufacturing method comprising a step for manufacturing a light shield layer by filling a plurality of light shield recesses in a first master with a light shield material. This first master has a plurality of light shield recesses dividing a plurality of areas, and a top layer formed at least around openings into the light shield recesses for repelling a light shield material. Further steps in this manufacturing method include: a step for forming a light transmitting layer having a plurality of color recesses integrated with the light shield layer by pressing tightly, together with a light transmitting layer precursor disposed therebetween, a second master and the first master having the light shield layer formed thereon; a step for separating said first master from the light transmitting layer and the light shield layer; and a step for forming a color pattern layer by filling a color material into the color recesses.

In this method according to the present invention light shield recesses in a first master are filled with a light shield material to form a light shield layer. This light shield layer is molded integrally with a light transmitting layer. The light transmitting layer also has color recesses which are filled with a color material. The color material thus forms a color pattern layer, and the light shield material forms a light shield layer. This light shield layer becomes a black matrix. The first master can then be separated from the light transmitting layer, and the resulting optical substrate used as a color filter. It should be noted that the second master can be separated or used as part of the optical substrate.

Deformation and voids do not occur in the color material because it is simply filled into corresponding recesses and not separated from the master.

The masters can also be reused multiple times insofar as their durability allows once they are manufactured. Steps for manufacturing the masters in this case can be omitted from the manufacturing process used for second and subsequent color filters, thereby reducing the number of manufacturing steps and contributing to cost reduction.

A top layer that repels the light shield material is also formed at least around the opening to each light shield recess in this exemplary method of the present invention. When the light shield material is then filled into the light shield recesses, this top layer makes it difficult for the light shield material to adhere and remain anywhere other than inside the light shield recesses.

The lines of the black matrix used in a high resolution color filter are extremely fine, and the light shield recesses for forming the black matrix are extremely small. The top layer formed around the openings into the light shield recesses in the present invention, however, enables the light shield material to be filled into the light shield recesses without protruding from and remaining around the recesses. As a result, it is possible using this method of the present invention to manufacture a high precision color filter.

The color recesses formed in the above-noted methods are preferably separated and formed by the light shield layer. This makes it possible to simultaneously form the color recesses when the light shield layer is formed.

The present invention further relates to an optical substrate manufacturing method comprising a step for manufacturing a light shield layer by filling a plurality of light shield recesses in a first master with a light shield material. This first master has a plurality of light shield recesses dividing a plurality of areas, and a top layer formed at least around openings into the light shield recesses for repelling a light shield material. Further steps include: a step for forming a light transmitting layer having a plurality of lenses integrated with the light shield layer by pressing tightly together, with a light transmitting layer precursor disposed therebetween, a second master having a plurality of curved parts and the first master having the light shield layer formed thereon; a step for separating the first master from the light transmitting layer and the light shield layer; and a step for separating the second master from the light transmitting layer.

By thus pressing first and second masters together with a light transmitting layer precursor disposed therebetween, the profile of the curved parts in the second master is transferred to the light transmitting layer precursor to form a plurality of lenses. It is therefore possible to easily manufacture an optical substrate as a microlens array having a plurality of lenses. Screen brightness can also be improved because incident light is converged by each lens.

The masters can also be reused multiple times insofar as their durability allows once they are manufactured. Steps for manufacturing the masters in this case can be omitted from the manufacturing process used for the second and subsequent microlens arrays, thereby reducing the number of manufacturing steps and contributing to cost reduction.

This microlens array also has a light shield layer formed by filling the light shield recesses of the first master with a light shield material. The resulting light shield layer is also integrated with the light transmitting layer. This light shield layer forms a black matrix, making it possible to improve contrast between pixels.

It is therefore possible to easily manufacture, by a transfer molding process, a microlens array whereby both a bright display can be achieved and contrast can be improved.

A top layer that repels the light shield material is also formed at least around the opening to each light shield recess in this exemplary method of the present invention. When the light shield material is then filled into the light shield recesses, this top layer makes it difficult for the light shield material to adhere and remain anywhere other than inside the light shield recesses.

When the resulting microlens array is used with a LCD panel requiring high resolution, the lines of the black matrix are extremely fine. The light shield recesses for forming the black matrix are therefore extremely small. The top layer formed around the openings into the light shield recesses in the present invention, however, enables the light shield material to be filled into the light shield recesses without protruding from and remaining around the recesses. As a result, it is possible using this method of the present invention to manufacture a microlens array that can be used in a high resolution LCD panel or other type of display panel.

In each of the above-described manufacturing methods according to the present invention the first master preferably has strong affinity with the light shield material. This increases the difference in affinity with the light shield material between the top layer and the inside of the light shield recesses, and thus makes it even easier to fill the light shield recesses with light shield material.

Further preferably, a process producing the first master in the above methods includes a step for forming the top layer by forming a metal base layer on a substrate, and self-assembling a sulfur compound on the metal base layer. The top layer is thus strongly bonded to the layer on which it is formed.

Yet further preferably, the light shield material is hydrophilic and the top layer is water repellent, or the light shield material is water repellent and the top layer is hydrophilic.

The present invention further relates to an optical substrate manufactured by any of the above-described methods of the present invention.

The present invention also relates to an optical substrate comprising: a light transmitting layer having a plurality of light shield recesses dividing a plurality of areas formed on one surface thereof, and a plurality of color recesses corresponding to said areas divided by said light shield recesses formed on an opposite surface of the light transmitting layer; a light shield layer formed by filling said light shield recesses with a light shield material; a top layer formed at least around openings into the light shield recesses for repelling the light shield material; and a color pattern layer formed by filling a color material into the color recesses.

A further optical substrate according to the present invention comprises a light transmitting layer having a plurality of light shield recesses dividing a plurality of areas formed on one surface thereof, and a plurality of lenses corresponding to the areas divided by the light shield recesses formed on an opposite surface of the light transmitting layer; a light shield layer formed by filling the light shield recesses with a light shield material; and a top for repelling said light shield material formed at least around an opening to the light shield recesses layer.

The present invention further relates to a display device comprising an optical substrate according to the present invention; and a light source for emitting light to said optical substrate.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Preferred embodiments of the present invention are described below with reference to the accompanying figures.
Embodiment 1

A manufacturing method for a color filter according to a first preferred embodiment of the present invention is described first below with reference to FIG. 1A to FIG. 6C.

Figure 1A:
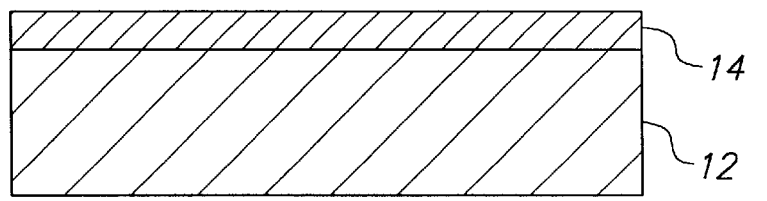
FIG. 1A to FIG. 6E show various steps in a color filter manufacturing method according to a first preferred embodiment of the present invention.

Referring first to FIG. 1A, a resist layer 14 is formed on a substrate 12. The surface of this substrate 12 is then etched (as described with reference to FIGS. 1B–1D) to produce a first master 10 having a plurality of first raised parts (first projections) 18 as shown in FIG. 1E. The substrate 12 can be of any etchable material, but is preferably of silicon or quartz because of the ease with which these materials can be etched to form high precision first raised parts 18.

The material used for the resist layer 14 is preferably a commercially available positive resist material commonly used in the manufacture of semiconductor devices. One such material is a cresol novolak resin with a diazonaphthoquinone derivative added as a photosensitizer. It is to be noted that a positive resist as used herein means a material which, when exposed to radiation through a mask so that only selective parts of the material are bombarded by the radiation, enables those bombarded parts to be selectively removed by a developing solution.

The resist layer 14 can be formed using such methods as spin coating, dipping, spray coating, roll coating, and bar coating.

Figure 1B:
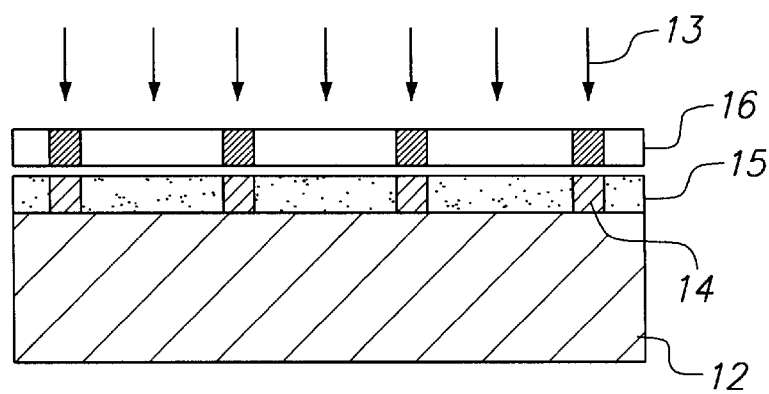

The next step, as shown in FIG. 1B, is to place a mask 16 over the resist layer 14, and expose the resist layer 14 to radiation 13 through the mask 16, thus forming exposed area 15.

More specifically, the mask 16 is patterned to block radiation 13 at least from those areas where the first raised parts 18 shown in FIG. 1E are to be formed. The flat shape of the first raised parts 18 produces the shape of a black matrix typically used in an LCD panel, and delineates the areas 19 corresponding to the plurality of pixels of the display. It should be further noted that the configuration of this black matrix corresponds to the mosaic, delta, striped, or other pixel arrangement.

The radiation 13 is preferably light with a wavelength in the 200 nm to 500 nm range. Using light in this wavelength range makes it possible to use photolithography techniques and systems already proven in LCD panel manufacturing processes, and thus helps minimize manufacturing costs.

Figure 1C:
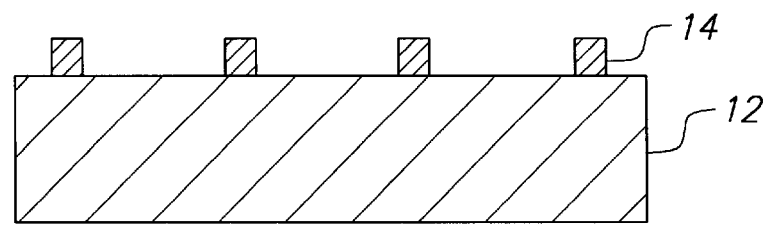

After exposing the resist layer 14 to radiation 13, the resist layer 14 is processed under specific developing conditions to selectively remove the exposed area 15 as shown in FIG. 1C. This developing step exposes the substrate 12 in the exposed area 15, and leaves the substrate 12 covered by the resist layer 14 where the resist layer 14 was not exposed to radiation.

Figure 1D:
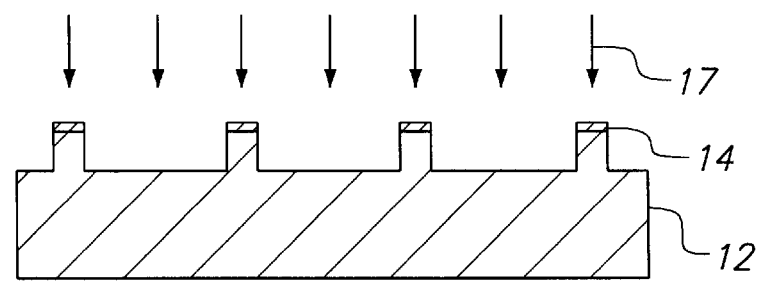
Figure 1E:
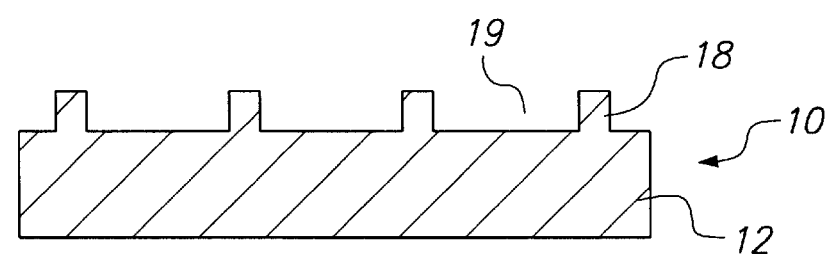

After thus patterning the resist layer 14, the resist layer 14 is used as a mask for etching the substrate 12 to a specific depth as shown in FIG. 1D.

Wet or dry etching techniques can be used. The technique and etching conditions used are determined according to the substrate 12 material with consideration for the cross sectional shape of the etched area, etching rate, substrate uniformity, and other factors.

Dry etching affords better control, and can be accomplished with, for example, parallel plate reactive ion etching (RIE), inductively coupled plasma etching (ICP), electron cyclotron resonance etching (ECR), helicon excited etching, magnetron enhanced etching, plasma etching, or ion beam etching systems. By adjusting the type of etching gas used, gas flow and pressure, bias voltage, and other conditions, the first raised parts 18 can be etched to the desired shaped, including rectangular or tapered. The surface roughness of the first raised parts 18 can also be easily controlled.

After etching is completed, the resist layer 14 is removed as shown in FIG. 1E, leaving first raised parts 18 on the surface of substrate 12 and completing the master 10.

Figure 2A:
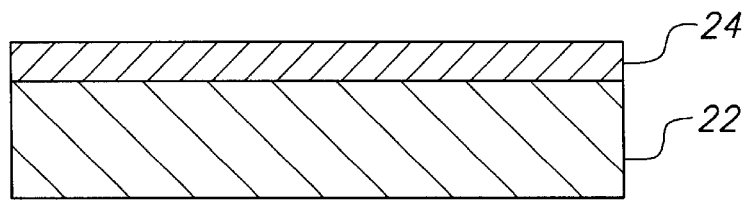

Referring next to FIG. 2A, a resist layer 24 is formed on a separate substrate 22. The surface of this substrate 22 is then etched (as described with reference to FIGS. 2B–2D) to produce a second master 20 having a plurality of second raised parts (second projections) 28 as shown in FIG. 2E. The materials used for the above-noted first substrate 12 can be used for this substrate 22. The materials and methods used for forming and processing the resist are also the same as those used for the above-noted resist layer 14.

Figure 2B:
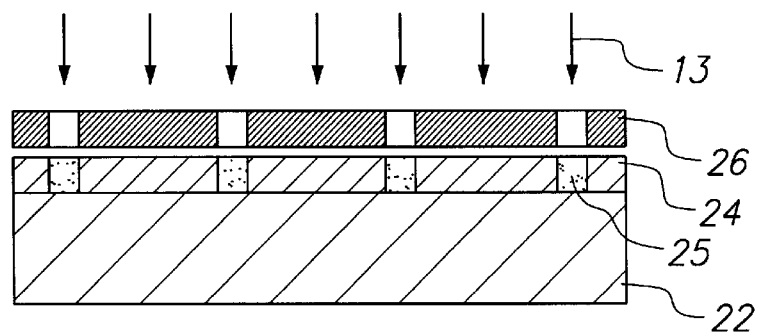

A mask 26 is then placed over the resist layer 24, which is then exposed to radiation 13 through the mask 26 to form exposed area 25 as shown in FIG. 2B.

This mask 26 is likewise patterned to block radiation 13 from those areas where the second raised parts 28 shown in FIG. 2E are to be formed. These second raised parts 28 are formed where the pixels are to be located. To produce a typical LCD panel with approximately 900,000 pixels, for example with 640×480×3 (colors) pixels, approximately 900,000, second raised parts 28 are formed on the second master 20 at an approximately 100 μm pitch. Because these second raised parts 28 correspond to the pixels, they are shaped, sized, and arranged to be enclosed by the first raised parts 18 corresponding to the black matrix.

Figure 2C:
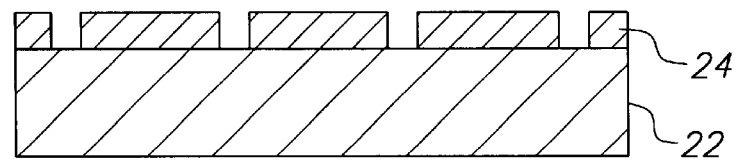

After exposing the resist layer 24 to radiation 13, it is developed under specific process conditions to selectively remove the exposed area 25 as shown in FIG. 2C. This developing step exposes the substrate 22 in the exposed area 25 of the resist, and leaves the substrate 22 covered by the resist layer 24 where it was not exposed to radiation.

Figure 2D:
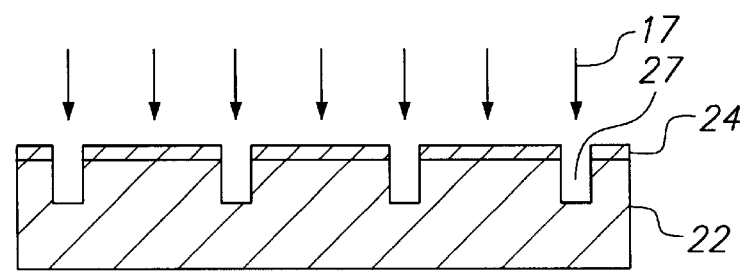
Figure 2E:
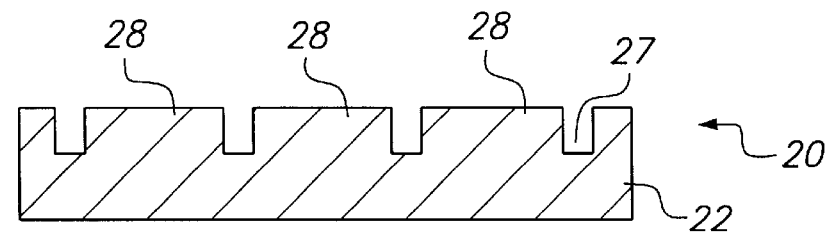

After thus patterning the resist layer 24, the resist layer 24 is used as a mask for etching the substrate 22 to a specific depth using an etchant 17, thus forming channels 27 as shown in FIG. 2D. When etching is completed and the resist 24 remaining on the substrate 22 is removed, a plurality of second raised parts 28 segmented by the channels 27 is formed. This results in a second master 20.

After the first and second masters 10 and 20 are thus obtained, the processes shown in FIG. 3A to FIG. 6C are performed as described below.

Figure 3A:
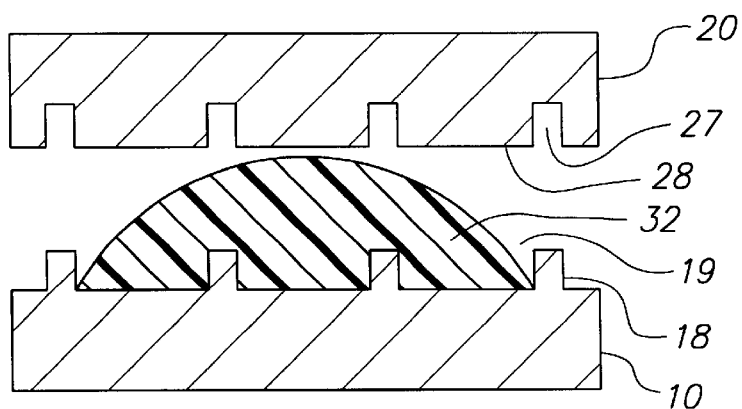

First, as shown in FIG. 3A, the first master 10 and second master 20 are pressed together with a first light transmitting layer precursor 32 disposed therebetween. This first light transmitting layer precursor 32 becomes the first light transmitting layer 30 shown in FIG. 3D. It should be noted that while the first master 10 is shown on the bottom in FIG. 3A, the second master 20 can alternatively be placed on the bottom.

The light transmitting layer precursor 32 can be any material with light transparency that will not impair the color characteristic of the color pattern layer 40 at the thickness of the area in which the color pattern layer 40 (see FIG. 4B) is formed on the first light transmitting layer 30. While various materials can thus be used, one that can be set by applying energy is preferable. Such materials can be handled as low viscosity fluids during the formation of light transmitting layer 30, and can be easily filled at normal room temperature and pressure to the microareas of channels 27 formed between the second raised parts 28 of second master 20 and the areas 19 formed between first raised parts 18 of first master 10.

Exemplary energy-setting resins can be set by applying either light or heat. Using light or heat makes it possible to use common exposing systems, baking ovens, hot plates, or other heating apparatuses. Such materials thus contribute to lower equipment and production costs.

Exemplary energy-setting resins include: acrylic resins, epoxy resins, melamine resins, and polyimide resins. Acrylic resins in particular are desirable because a wide range of commercially available precursors and photosensitizers (photopolymerization initiators) can be used, the resin can be set in a short time by exposure to light, and a light transmitting layer with excellent optical characteristics can be achieved.

Specific examples of the basic composition of a photosetting acrylic resin include prepolymers, oligomers, monomers, and photopolymerization initiators.

Exemplary prepolymers and oligomers include: acrylates such as epoxy acrylate, urethane acrylate, polyester acrylate, polyether acrylate, and spiroacetal acrylate; and methacrylates such as epoxy methacrylate, urethane methacrylate, polyester methacrylate, and polyether methacrylate.

Exemplary monomers include: monofunctional monomers such as 2-ethylhexyl acrylate, 2-ethylhexyl methacrylate, 2-hydroxyethyl acrylate, 2-hydroxyethyl methacrylate, n-vinyl-2-pyrrolidone, Carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexacrylate.

Exemplary photopolymerization initiators include: acetophenone compounds such as 2,2-dimethoxy-2-phenyl acetophenone; butyl phenone compounds such as a-hydroxy isobutyl phenone and p-isopropyl-a-hydroxy isobutyl phenone; halogenated acetophenone compounds such as p-tert-butyl dichloro acetophenone, p-tert-butyl trichloro acetophenone, and a,a-dichlor-4-phenoxy acetophenone; benzophenone compounds such as benzophenone [diphenyl ketone], and n,n-tetraethyl-4,4-diamino benzophenone; benzyl compounds such as benzyl, and benzyldimethyl ketal; benzoin compounds such as benzoin and benzoinalkylether; oxime compounds such as 1-phenyl-1,2-propanedione-2-(o- ethoxycarbonyl) oxime; xanthone compounds such as 2-methylthio xanthone, and 2-chlorothio xanthone; benzoin ether compounds such as benzoin ether and isobutyl benzoin ether; and radical forming compounds such as Michler's ketone and benzyl methyl ketal.

Various additives can also be added as required. For example, amines or other compounds can be added to prevent oxygen from inhibiting resin setting, and solvents can be added to improve coating properties. The solvents that can be used include but are not limited to such organic solvents as: propylene glycol monomethylether acetate, methoxymethyl propionate, ethoxyethyl propionate, ethyl lactate, ethyl pyruvate, and methyl amyl ketone.

As noted above, the masters are preferably made from silicon or quartz because of their excellent high precision etchability. In addition to their optical properties, the above-noted photosetting acrylic resins are further preferable because they can be easily separated from these silicon or quartz master materials.

It should be further noted that while the light transmitting layer precursor 32 is described above as deposited, e.g. by dripping, onto the first master 10, it can be alternatively deposited on the second master 20 or on both the first and second master 10 and 20. The light transmitting layer precursor 32 can yet further alternatively be deposited on either or both the first and second master 10 and 20 by spin coating, dipping, spray coating, roll coating, and bar coating.

Figure 3B:
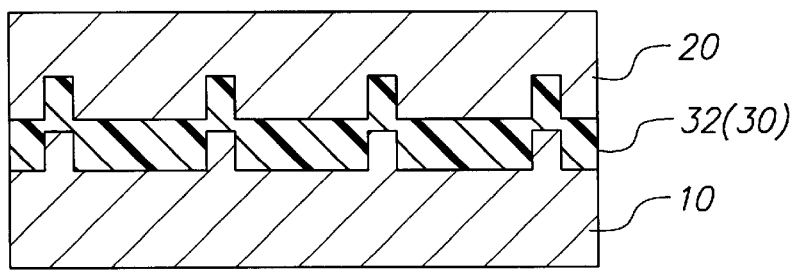

As shown in FIG. 3B, the light transmitting layer precursor 32 is then spread to cover a specific area, forming a light transmitting layer 30 between the masters 10 and 20. To spread the light transmitting layer precursor 32 to cover the specific area, a specified pressure can be applied as required to either or both the masters 10 and 20.

Figure 3C:
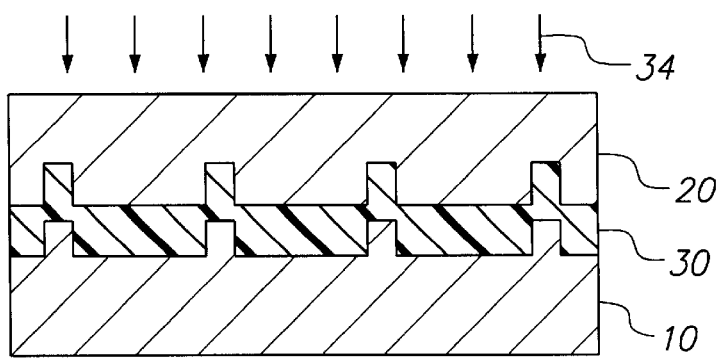

The light transmitting layer precursor 32 is then exposed to a specific amount of radiation 34 through either or both master 10 and 20 to set the first light transmitting layer 30 as shown in FIG. 3C.

Figure 3D:
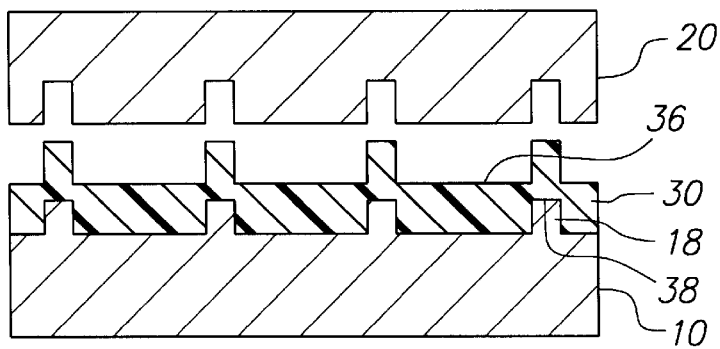

The second master 20 is then removed from the first light transmitting layer 30 as shown in FIG. 3D, leaving on the first master 10 a first light transmitting layer 30 with color recesses 36 on the surface thereof. As will also be known from FIG. 3D, light shield recesses 38 are formed by first raised parts 18 of first master 10 in the surface of the first light transmitting layer 30 opposite the surface in which color recesses 36 are formed.

Figure 4A:
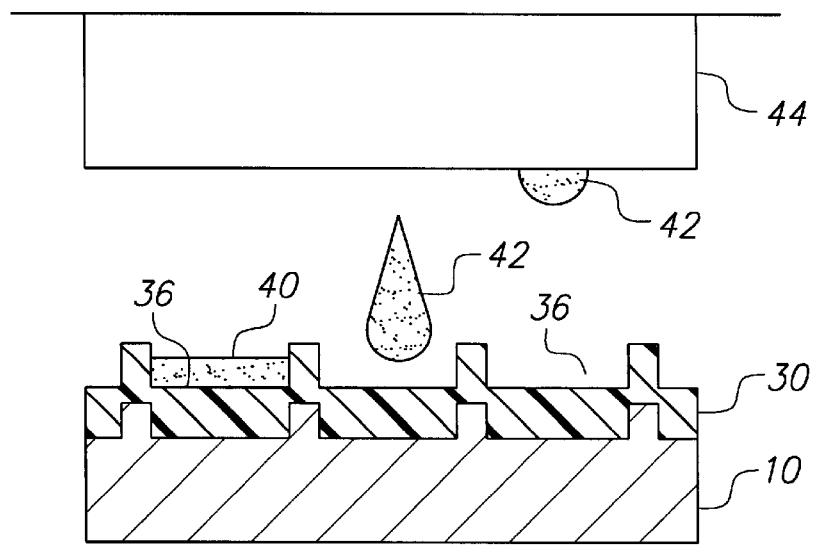

Referring next to FIGS. 4A and B, each of the color recesses 36 is filled with a predetermined color material 42 to form color pattern layer 40.

The color recesses 36 can be filled with color material 42 using various methods, but an ink jet type method is preferable. Ink jet spray methods have been proven in ink jet printers, and enable the color recesses 36 to be filled quickly, economically, and without waste.

FIG. 4A shows the color recesses 36 being filled with typically red, green, and blue color material 42 using an ink jet head 44. More specifically, the ink jet head 44 is positioned proximately to the color recesses 36, and color material 42 of the appropriate color is ejected therefrom into the appropriate color recess 36.

Various types of ink jet heads 44 have been proven and can be used, including, for example, piezo jet types using piezoelectric elements, bubble jet types using an electro-thermal conversion element as the energy generating means. Such ink jet heads 44 enable both coverage and the ejection pattern to be controlled as desired.

If an ink jet head 44 having an array of 64 nozzles for ejecting color material 42 is used, for example, and three drops are ejected into each color recess 36 at a drive frequency of 14.4 kHz (ejecting 14,400 drops per second), the time required to fill each of the color recesses 36 in an approximately 900,000 pixel display panel is: 900,000×3 drops/(14,400 times×64 nozzles)=approx. 3 seconds.

Even considering the time required to move the ink jet head 44 between color recesses 36, all color recesses 36 can be filled with color material 42 in only two to three minutes. To assure the color recesses 36 are filled with a uniform amount of color material 42, the ink jet head 44 is moved and otherwise controlled to control the position at which color material is ejected.

When the color material 42 contains solvent, the solvent is evaporated by heat treatment. Removing the solvent, however, causes the color material 42 to contract. It is therefore necessary to fill the recesses with enough color material 42 so that the thickness needed to assure the required color density remains after solvent evaporation and color material shrinkage.

Figure 4B:
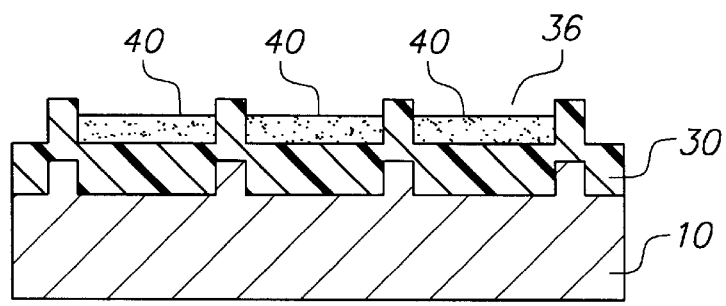

This process forms a color pattern layer 40 on the first light transmitting layer 30 as shown in FIG. 4B.

Figure 5A:
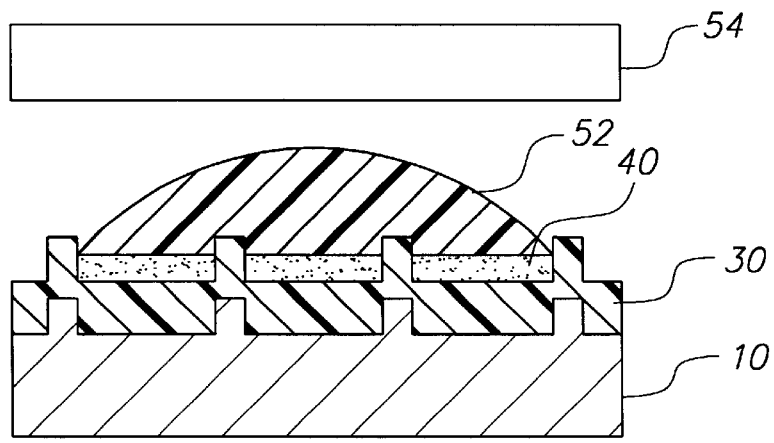

As shown in FIG. 5A, a second light transmitting layer precursor 52 is next deposited on color pattern layer 40. The materials used for the first light transmitting layer precursor 32 can also be used for this second light transmitting layer precursor 52. A reinforcing layer 54 is then pressed onto the light transmitting layer precursor 52 to compress and spread the light transmitting layer precursor 52. It should be noted that the light transmitting layer precursor 52 can be alternatively coated onto the color pattern layer 40 or reinforcing layer 54 by a spin coating, roll coating, or other methods, and the reinforcing layer 54 then pressed onto the color pattern layer 40.

The reinforcing layer 54 is typically glass, but the invention shall not be so limited. More specifically, the reinforcing layer 54 can be made of any material whereby the color transparency, mechanical strength, and other physical properties required in the color filter can be achieved. Exemplary reinforcing layer 54 materials include plastic plates or films of polycarbonate, polyarylate, polyether sulfone, amorphous polyolefin, polyethylene terephthalate, and polymethyl methacrylate.

Figure 5B:
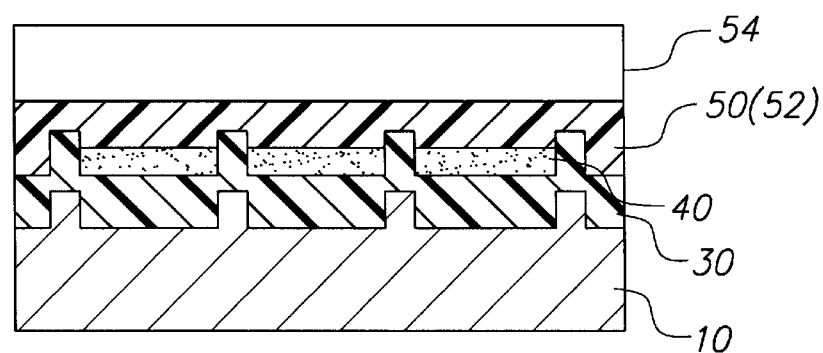

A second light transmitting layer 50 is thus formed as shown in FIG. 5B by spreading the light transmitting layer precursor 52. The light transmitting layer 50 is then set by a resin setting process appropriate to the composition of the light transmitting layer precursor 52. If a UV-setting acrylic resin is used, the light transmitting layer 50 can be simply set by exposure to ultraviolet light under specific conditions.

If the mechanical strength, gas barrier properties, chemical resistance, and other properties required for the color filter can be achieved with the light transmitting layer 50 alone, the reinforcing layer 54 is not needed and can be removed.

Figure 5C:
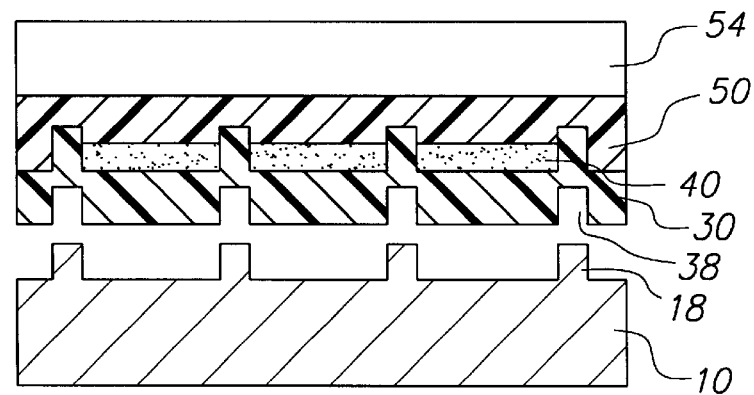

The first master 10 is then separated from the first light transmitting layer 30 as shown in FIG. 5C. Note again that light shield recesses 38 are formed in the first light transmitting layer 30 by the first raised parts 18 of first master 10.

Figure 6A:
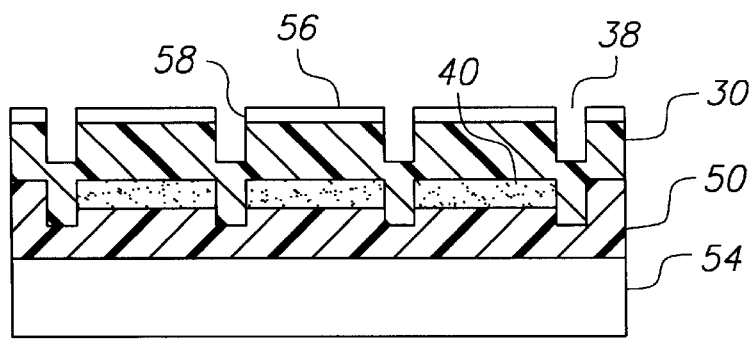
Figure 6B:
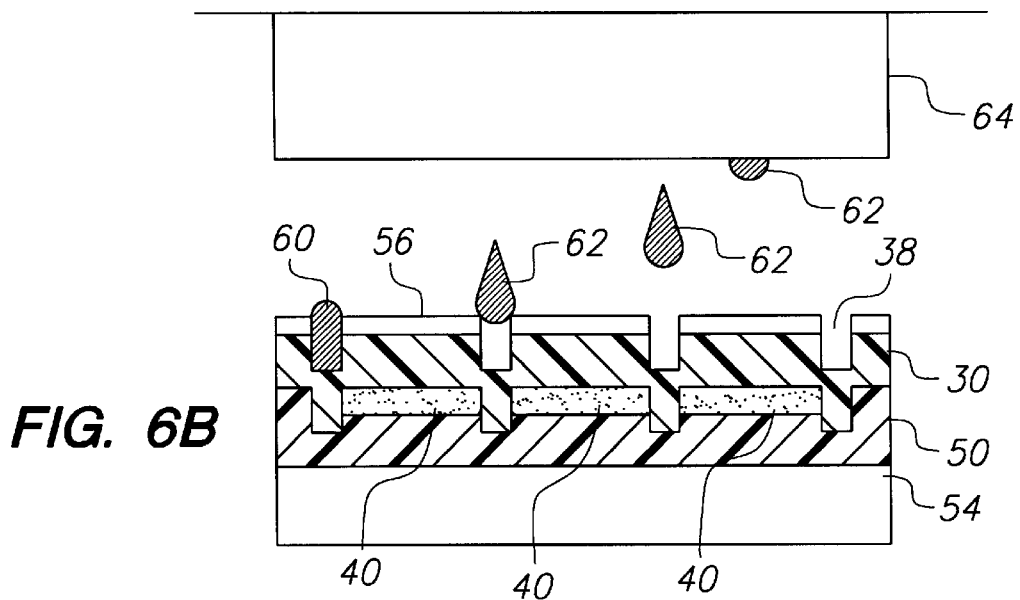

A top layer 56 is next formed on the surface in which light shield recesses 38 are formed in the first light transmitting layer 30 as shown in FIG. 6A. These light shield recesses 38 are then filled with a light shield material 62 as shown in FIG. 6B. It should be noted that light shield recesses 38 are positioned between the color pattern layer 40 such that a black matrix is formed by filling the recesses 38 with light shield material 62.

The top layer 56 is formed from a material that will repel the light shield material 62. For example, if the light shield material 62 is hydrophilic, the top layer 56 is water repellent; if the light shield material 62 is water repellent, the top layer 56 is hydrophilic. Openings 58 are formed in the top layer 56 so that the openings to the light shield recesses 38 are not blocked. More specifically, the openings 58 are formed so that the sides of the openings 58 are flush with the inside wall of the light shield recesses 38. The size of each of the light shield recesses 38 is thus also maintained by the openings 58 in top layer 56.

The light shield material 62 can be substantially any durable, opaque material. For example, the light shield material 62 can be a binder resin dissolved in solvent with a black dye or pigment. The solvent type is not specifically limited, and can be water or a variety of organic solvents. Exemplary organic solvents include: propylene glycol monomethylether acetate, propylene glycol monopropylether, methoxymethyl propionate, ethoxyethyl propionate, ethyl cellusolve, ethyl cellusolve acetate, ethyl lactate, ethyl pyruvate, methyl amyl ketone, cyclohexanone, xylene, toluene, butyl acetate. These solvents can further be used singly or in mixtures thereof.

The light shield recesses 38 can be filled with light shield material 62 using various methods, but an ink jet type method is preferable. Ink jet spray methods have been proven in ink jet printers, and enable the light shield recesses 38 to be filled quickly, economically, and without waste. When filling the light shield material 62 into the recesses, the ink jet head 45 is positioned and driven appropriately to fill each recess 38 in the first light transmitting layer 30 with a specific amount of material 62. In this preferred embodiment of the invention, however, a top layer 56 that repels the light shield material 62 is formed on the first light transmitting layer 30, and the light shield material 62 will therefore not spread from the light shield recesses 38. It is therefore possible for the ink jet head 45 to eject drops of light shield material 62 that are larger than the opening to the light shield recess 38 because the top layer 56 repels the light shield material 62 and the light shield material 62 thus collects inside the recess 38. It is therefore possible to form a high precision black matrix.

Instead of using an ink jet head 45, it is alternatively possible to coat the light shield material 62 over the top layer 56 so that it flows and spreads into the recesses 38. Because the top layer 56 repels the light shield material 62, the light shield material 62 will flow naturally into the recesses 38, and any light shield material 62 remaining on the top layer 56 can be easily removed.

Filling the light shield recesses 38 is completed when the light shield material 62 has been filled uniformly into the recesses 38.

When the light shield material 62 contains solvent, the solvent is evaporated by heat treatment. Removing the solvent, however, causes the light shield material 62 to contract. It is therefore necessary to fill the recesses with enough material 62 so that the thickness needed to assure the required opacity remains after solvent evaporation and material shrinkage.

Figure 6C:
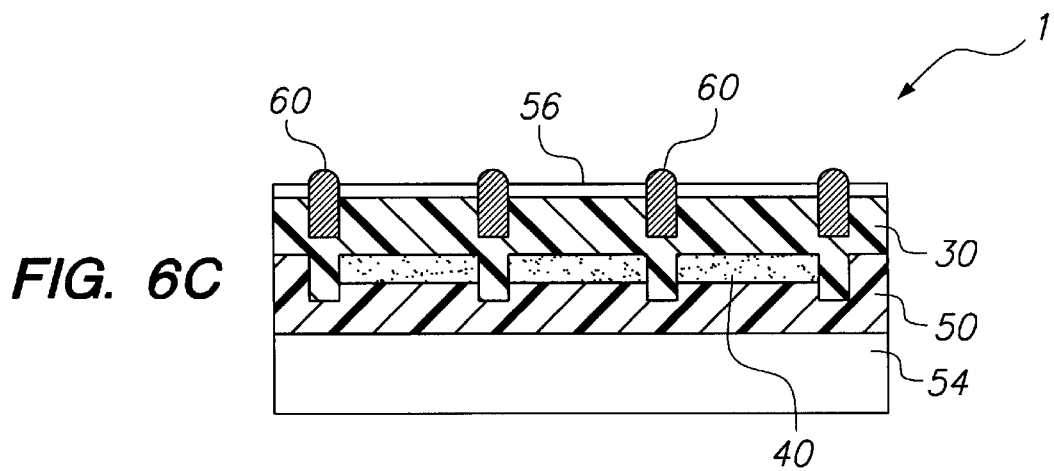

As shown in FIG. 6C, a light shield layer 60 is formed from the light shield material 62 integrally with the first light transmitting layer 30, resulting in a color filter (optical substrate) 1. This color filter 1 has color pattern layer 40 formed on the surface on one side of the first light transmitting layer 30 with the light shield layer 60 formed as a black matrix on the opposite side of the first light transmitting layer 30.

A third light transmitting layer can be additionally formed as required on the side on which the light shield layer 60 is formed. The same material used for the light transmitting layer precursor 52 shown in FIG. 5A can be used to form this third light transmitting layer.

By thus forming top layer 56 on first light transmitting layer 30, light shield material 62 can be easily filled into the light shield recesses 38 in this preferred embodiment of the present invention.

It should be noted that in this preferred embodiment of the present invention the color material 42 or light shield material 62 are filled after the color recesses 36 and light shield recesses 38 are formed. Deformations or voids therefore do not occur in the color pattern layer 40 and light shield layer 60 because they are not separated from the masters 10 and 20.

Material is also used very efficiently, and the number of process steps can be reduced, by forming the color recesses 36 and light shield recesses 38 using a transfer method. The cost of the resulting color filter can therefore be reduced compared with a conventional color filter.

Furthermore, once manufactured, the masters 10 and 20 can be reused multiple times insofar as their durability allows. The steps for producing the masters 10 and 20 can therefore be eliminated from the manufacturing process used with second and subsequent color filters. The number of steps involved with color filter manufacture can thus be reduced, and color filter cost can therefore be further reduced compared with conventional color filters.

It should be further noted that while a positive resist is used above to form raised parts 18 and 28 on the masters 10 and 20, a negative resist which is insoluble in the developer solution in the areas exposed to radiation, is soluble where not exposed, and can therefore be selectively removed, can be alternatively used. The pattern of the masks 16 and 26 in this case is opposite to that described above. Further alternatively, the resist can be directly patterned using a laser beam or electron beam in place of using a mask for exposure.

Embodiment 2

A manufacturing method for a color filter according to a second preferred embodiment of the present invention is described next below with reference to FIG. 7A to FIG. 9B.

Figure 7A:
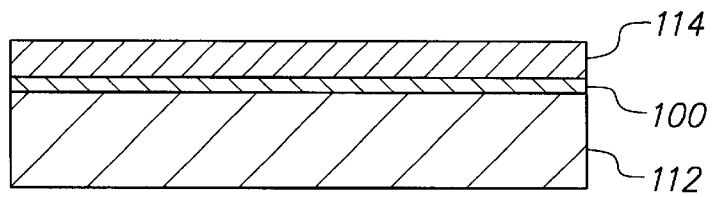
FIG. 7A to FIG. 9B show various steps in a color filter manufacturing method according to a second preferred embodiment of the present invention.

As shown in FIG. 7A, a substrate 112 having a top layer 100 is prepared, and a resist layer 114 is then formed thereon.

Figure 7B:
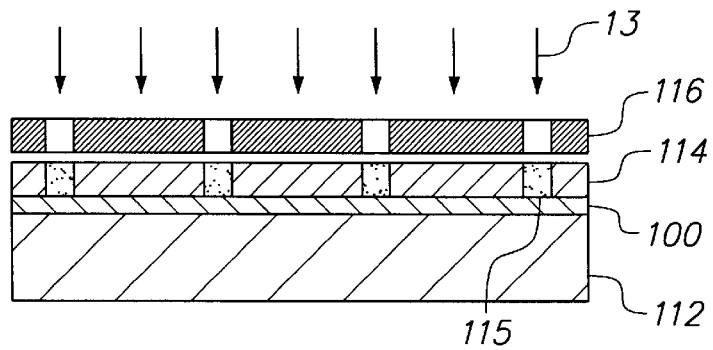
Figure 7C:
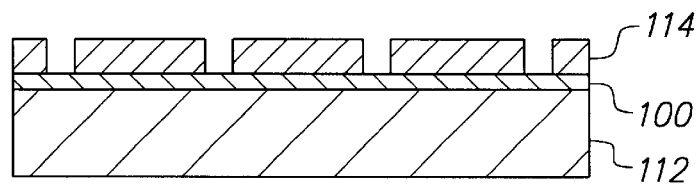
Figure 7D:
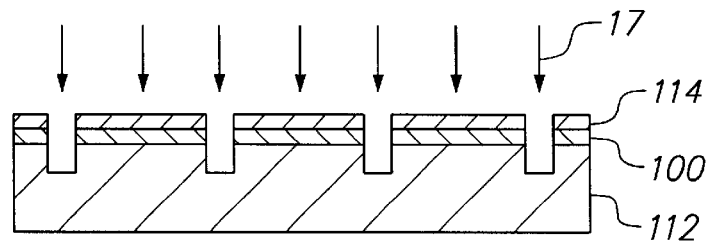
Figure 7E:
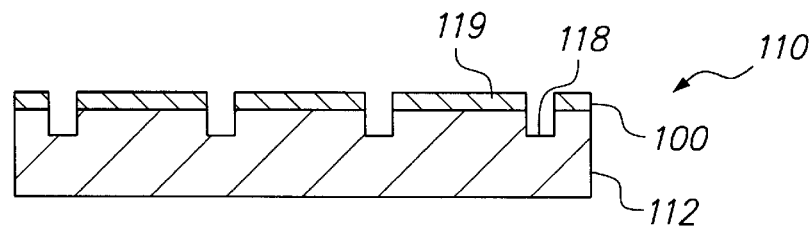

The surface of the substrate 112 is then etched (as described with reference to FIGS. 7B–7D) to produce a first master 110 in which light shield recesses 118 are formed as shown in FIG. 7E. The substrate 112 can be of any etchable material, but is preferably of silicon or quartz because of the ease with which these materials can be etched to form high precision light shield recesses 118. In addition, if a material with a strong affinity for the light shield material (shown in FIG. 8A) is used for the substrate 112, the light shield material can be easily filled into the light shield recesses 118.

Figure 8A:
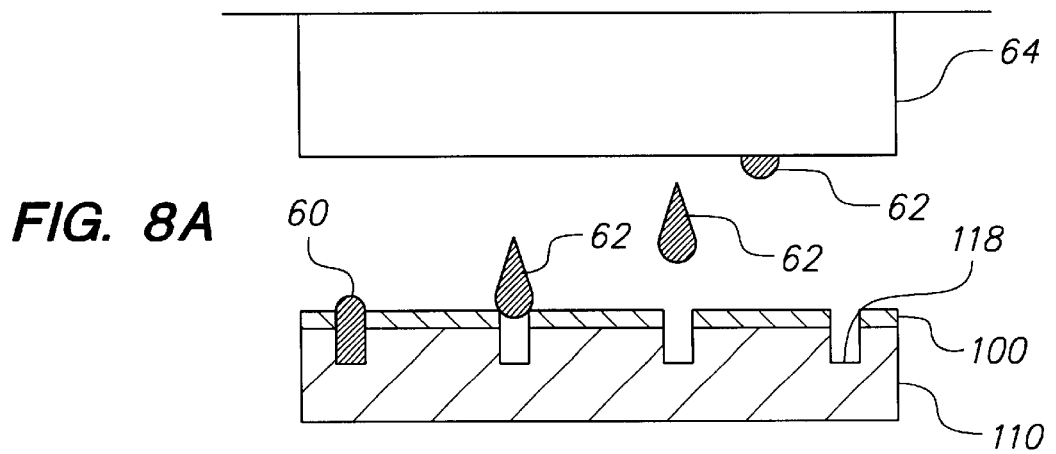

The top layer 100 is a material that repels the light shield material shown in FIG. 8A. For example, if the light shield material is hydrophilic, the top layer 100 is silicon or other water repellent material; if the light shield material is water repellent, the top layer 100 is metal, $SiO_2$, or other hydrophilic material. Alternatively, if the top layer 100 is made from a fluorocoating, the light shield material can be a hydrophilic or water repellent material.

Further alternatively, a metal base layer can be formed on the substrate 112, and a sulfur compound that repels the light shield material can be self-assembled on the metal base layer to form the top layer 100.

Exemplary materials for the metal base layer, referred to below as the metal layer, include gold (Au), silver (Ag), copper (Cu), and indium (In). This metal layer is the substrate upon which the sulfur compound is self-assembled and fixed. The thickness of the metal layer is therefore typically approximately 100 to 2000 angstroms ($10^{-10}$ m).

The metal layer can be formed by sputtering, vapor deposition, chemical vapor deposition (CVD), or electroless plating. It should be further noted that an intermediate layer of titanium (Ti) or chrome (Cr), for example, can be additionally provided to improve adhesion between the substrate 112 and the metal layer.

The sulfur compound is preferably a thiol compound. Note that thiol is a common term for organic compounds (R—SH where R is an alkyl or other hydrocarbon radical) having a mercaptan base (—SH). Thiol compounds such as $C_nF_{2n+1}C_mH_{2m}SH$ (where n and m are natural numbers) having a fluorine (F) component generally repel the light shield material and are therefore particularly preferable. The selected thiol compound is then dissolved in an organic solvent such as dichloromethane or trichloromethane to a 0.1 to 10 mM solution. When the substrate 112 and metal layer formed thereon are immersed in this solution, the thiol compound is self-assembled with the metal layer, the atoms of the metal layer covalently bonding with the sulfur atoms (S) of the thiol compound, thus forming a strong monomolecular thiol compound film over the metal layer. It should be noted that the sulfur compound is not limited to a thiol compound, and can be an organic compound with a disulfide bond (S—S) such as $R_1$—S—S—$R_2$, where $R_1$ and $R_2$ are an alkyl or other hydrocarbon base.

It is thus possible to easily form integrally with substrate 112 a fine, strong top layer that will repel the light shield material.

The resist layer 114 can be formed using the same materials and method used with the resist layer 14 of the first embodiment described above.

The next step, as shown in FIG. 7B, is to place a mask 116 over the resist layer 114, and expose the resist layer 114 to radiation 13 through the mask 116, thus forming exposed area 115.

This radiation 13 can be the same as the radiation 13 described in the first embodiment above.

More specifically, the mask 116 is patterned to pass radiation 13 at least to those areas where the light shield recesses 118 shown in FIG. 7E are to be formed. The flat shape of the light shield recesses 118 produces the shape of a black matrix typically used in an LCD panel, and defines the areas 119 corresponding to the plurality of pixels of the display.

After exposing the resist layer 114 to radiation 13, the resist layer 114 is processed under specific developing conditions to selectively remove the exposed area 115 as shown in FIG. 7C. This developing step exposes the substrate 112 in the exposed area 115, and leaves the substrate 112 covered by the resist layer 114 where the resist layer 114 was not exposed to radiation.

After thus patterning the resist layer 114, it is used as a mask for etching the substrate 112 to a specific depth as shown in FIG. 7D. Etching can also be accomplished as described in the first embodiment above.

After etching is completed, the resist layer 114 is removed as shown in FIG. 7E, leaving light shield recesses 118 on the surface of substrate 112 and completing the master 110. These light shield recesses 118 define a plurality of areas 119.

The resulting light shield recesses 118 in the first master 110 are then filled with light shield material 62 as shown in FIG. 8A. The light shield layer 60 is thus formed. This light shield layer 60 becomes a black matrix. The materials and filling method used for this light shield material 62 can be selected from those described in the first embodiment above. When the light shield material 62 has been filled to the corners and microareas of the light shield recesses 118, filling is completed.

Figure 8B:
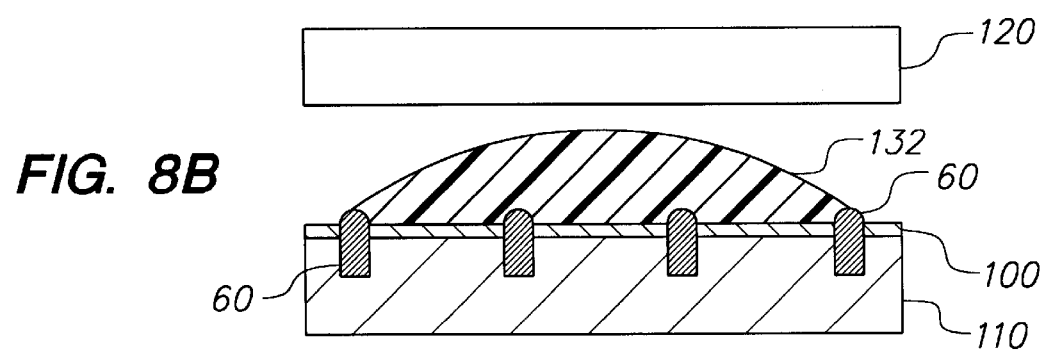

The first master 110 and second master 120 are then pressed together with a light transmitting layer precursor 132 disposed therebetween as shown in FIG. 8B.

The second master 120 has a smooth, flat surface with no raised or recessed parts, and the material thereof is not specifically limited. The second master 120 can also be formed using the same materials used for the first master 110. However, if the second master 120 is left as part of the color filter, it must have optical transparency characteristics that will not interfere with the color characteristics of the color filter.

The light transmitting layer precursor 132 can also be made from any of the materials usable for the light transmitting layer precursor 32 of the first embodiment. The method of compressing the first master 110 and second master 120 together can also be any of the above-described methods. It should be further noted that while the first master 110 is shown on the bottom in FIG. 8B, the second master 120 can be alternatively on the bottom.

As shown in FIG. 8B, the light transmitting layer precursor 132 is then spread to cover a specific area, forming a light transmitting layer 130 between the masters 110 and 120. To spread the light transmitting layer precursor 132 to cover the specific area, a specified pressure can be applied as required to either or both the masters 110 and 120.

Figure 8C:
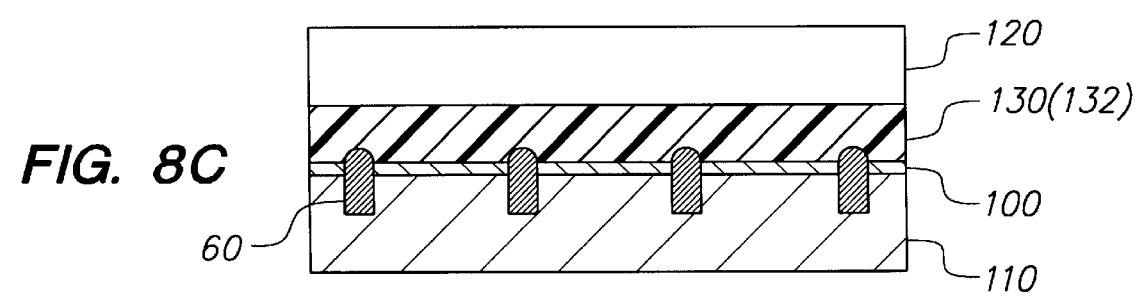

The light transmitting layer precursor 132 is then exposed to a specific amount of radiation through either or both master 110 and 120 to set the light transmitting layer 130 as shown in FIG. 8C.

Figure 9A:
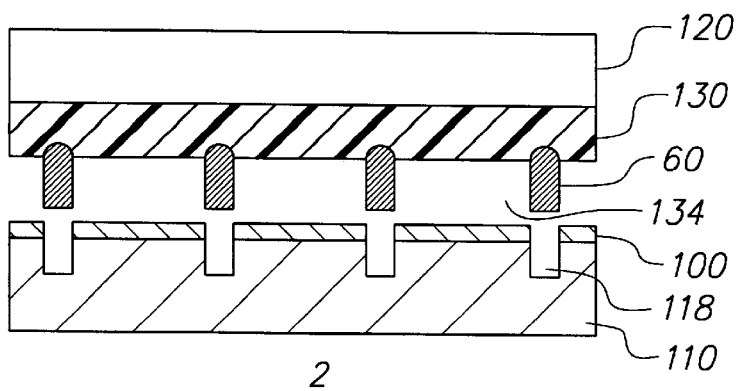
Figure 9B:
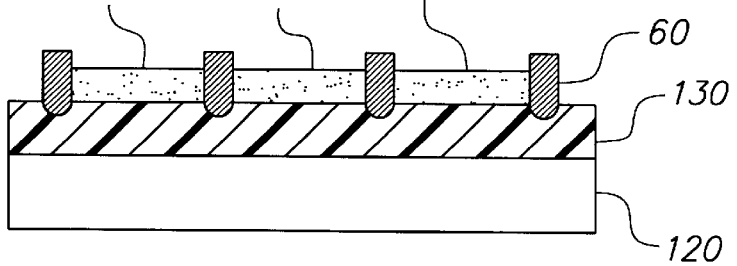

As shown in FIG. 9A, the first master 110 is then separated from the light transmitting layer 130 and light shield layer 60. The light shield layer 60 defines and forms the color recesses 134. The color recesses 134 are then filled with a color material to form a color pattern layer 140 as shown in FIG. 9B to form a color filter (optical substrate) 2. It should be noted that this color material can be any of the materials described with reference to the color material 42 in the above first embodiment, and can be filled into the color recesses 134 using the same methods.

While the second master 120 is used as a reinforcing layer in this color filter 2, it can be removed if the light transmitting layer 130 provides the mechanical strength required for the color filter.

It should also be noted that a second light transmitting layer can be formed over the color pattern layer 140 and light shield layer 60.

It should be noted that as in the first embodiment the light shield material 62 can be easily filled into the light shield recesses 118 in this preferred embodiment of the invention because of the top layer 100 formed on the first master 110 in which the light shield recesses 118 are formed.

Embodiment 3

A method of manufacturing a microlens array according to a third preferred embodiment of the present invention is described next below with reference to FIG. 10A to FIG. 13B.

Figure 10A:
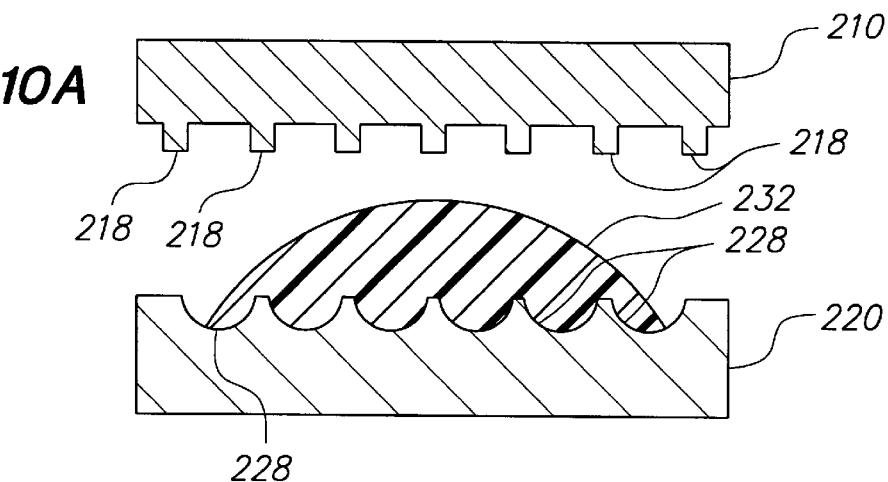
FIG. 10A to FIG. 12C show various steps in a microlens array manufacturing method according to a third preferred embodiment of the present invention.

First and second masters 210 and 220 as shown in FIG. 10A are first prepared. A plurality of raised parts 218 are formed on the surface of first master 210. When seen in a plan view (not shown in the figures), these raised parts 218 form a black matrix pattern. A plurality of concave parts 228 is similarly formed in the second master 220. Each of these concave parts 228 has a concave curvature that is the inverse of the surface profile of the convex lenses to be formed in the microlens array.

The raised parts 218 and concave parts 228 of these first and second masters 210 and 220 are in mutually corresponding positions such that the raised parts 218 are specifically positioned to avoid the middle of the concave parts 228.

The first and second masters 210 and 220 are then pressed together with a first light transmitting layer precursor 232 disposed therebetween. This light transmitting layer precursor 232 subsequently becomes the light transmitting layer 230 shown in FIG. 10B. It should be noted that this light transmitting layer precursor 232 can be made using any of the materials used for the light transmitting layer precursor 32 described above with reference to the first embodiment of the invention. The method of pressing the first and second masters 210 and 220 together can also be any of the methods described in the above first embodiment.

Figure 10B:
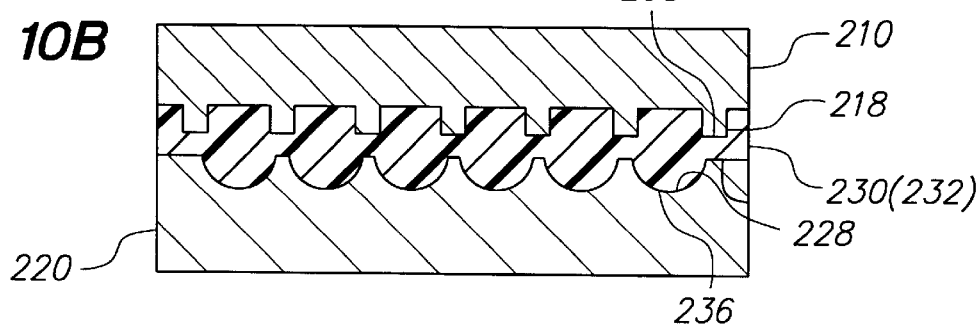

The light transmitting layer precursor 232 is thus spread to cover a specific area between the masters as shown in FIG. 10B, and is then set by a setting process appropriate to the selected material to form a light transmitting layer 230 between the masters 210 and 220.

A plurality of light shield recesses 238 transferred from the raised parts 218 is thus formed in the surface on one side of the light transmitting layer 230, and a plurality of lenses 236 transferred from the plurality of concave parts 228 is formed in the opposite side of the light transmitting layer 230. The plurality of light shield recesses 238 form a black matrix when seen in plan view (not shown in the figures). These light shield recesses 238 are also formed in an area removed from the center of the lenses 236.

Figure 11A:
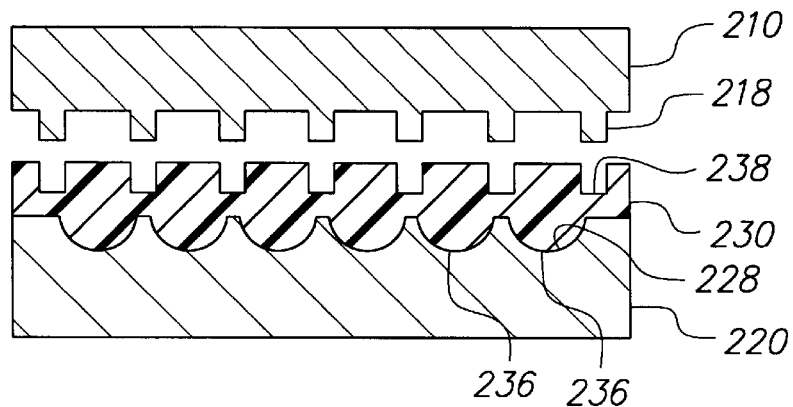

The first master 210 is then separated from the light transmitting layer 230 as shown in FIG. 11A, thereby opening the light shield recesses 238 transferred from the raised parts 218.

Figure 11B:
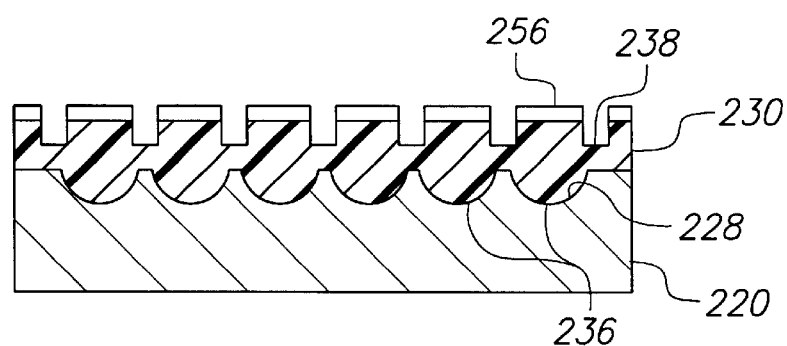

A top layer 256 is then formed on the surface of the light transmitting layer 230 in which the light shield recesses 238 are formed as shown in FIG. 11B. The top layer 256 is a material that repels the light shield material 262 that will fill the light shield recesses 238. Any of the materials and methods used for the top layer in the above first embodiment can be used for this top layer 256.

Figure 11C:
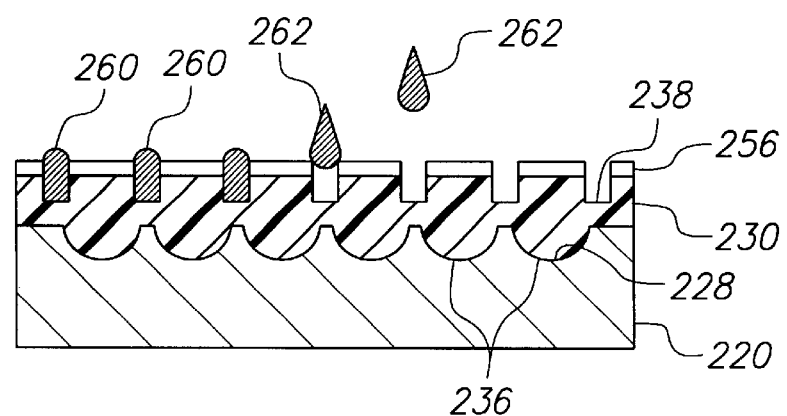

The light shield recesses 238 are then filled with the selected light shield material 262 to form a light shield layer 260 as shown in FIG. 11C. This light shield layer 260 becomes the black matrix. Any of the materials and methods used for the light shield material in the above first embodiment can be used for this light shield material 262.

Figure 12A:
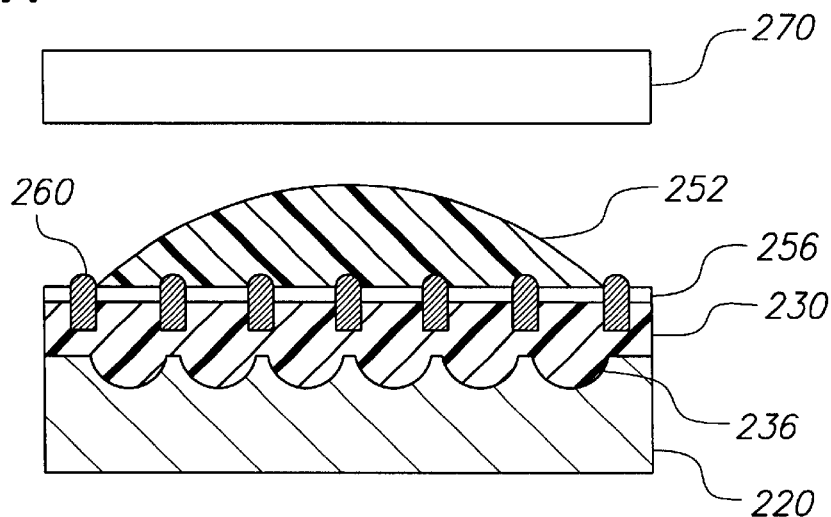

A second light transmitting layer precursor 252 is then deposited on the light transmitting layer 230 as shown in FIG. 12A. The material used for this light transmitting layer precursor 252 can be any of the materials usable for the light transmitting layer precursor 32 in the above first embodiment.

A reinforcing layer 270 is then pressed against the light transmitting layer precursor 252 to spread the precursor 252. It will also be obvious as described in the preceding embodiments of the invention that this light transmitting layer precursor 252 can be spread over the light transmitting layer 230 by a spin coating, roll coating, or other methods, or spread on the reinforcing layer 270 before pressing the reinforcing layer 270 onto the light shield layer 260.

The reinforcing layer 270 is typically glass, but the invention shall not be so limited. More specifically, the reinforcing layer 270 can be made of any material whereby the color transparency, mechanical strength, and other required physical properties can be achieved. Exemplary reinforcing layer materials include plastic plates or films of polycarbonate, polyarylate, polyether sulfone, amorphous polyolefin, polyethylene terephthalate, and polymethyl methacrylate.

Figure 12B:
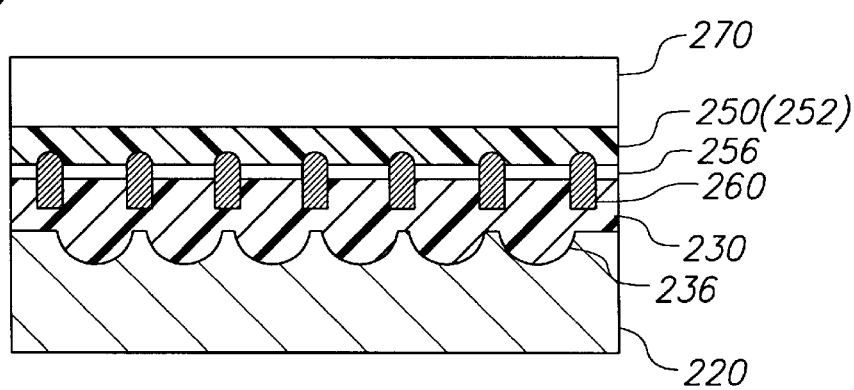

The light transmitting layer precursor 252 is then set by a resin setting process appropriate to the composition of the precursor material to form a second light transmitting layer 250 as shown in FIG. 12B. If a UV-setting acrylic resin is used, the light transmitting layer precursor 252 can be simply set by exposure to ultraviolet light under specific conditions.

Figure 12C:
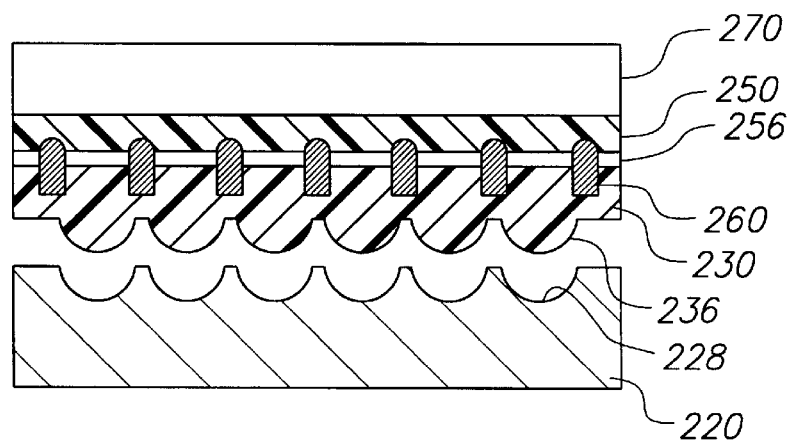

The second master 220 is next separated from the light transmitting layer 230 as shown in FIG. 12C. The resulting light transmitting layer 230 has convex lenses 236 formed in one surface thereof by the concave parts 228 of the second master 220.

Figure 13A:
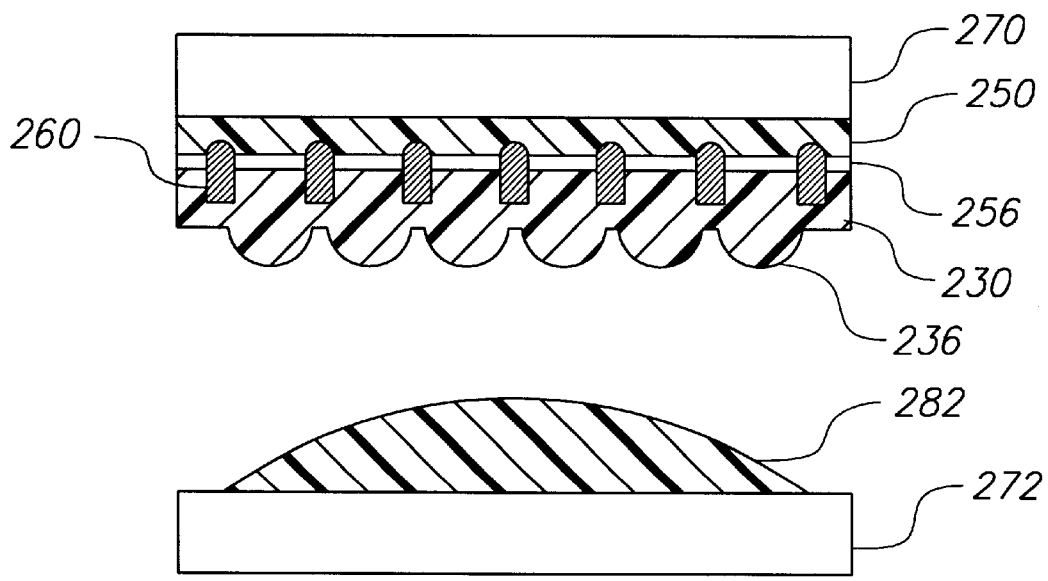

The lens 236 surface side of the light transmitting layer 230 is then pressed against a reinforcing layer 272 with a third light transmitting layer precursor 282 disposed therebetween as shown in FIG. 13A. Note that this process is the same as that shown in FIG. 12A, and the light transmitting layer precursor 282 can be selected from any of the materials usable as the light transmitting layer precursor 32 described above with reference to the first embodiment of the invention.

Figure 13B:
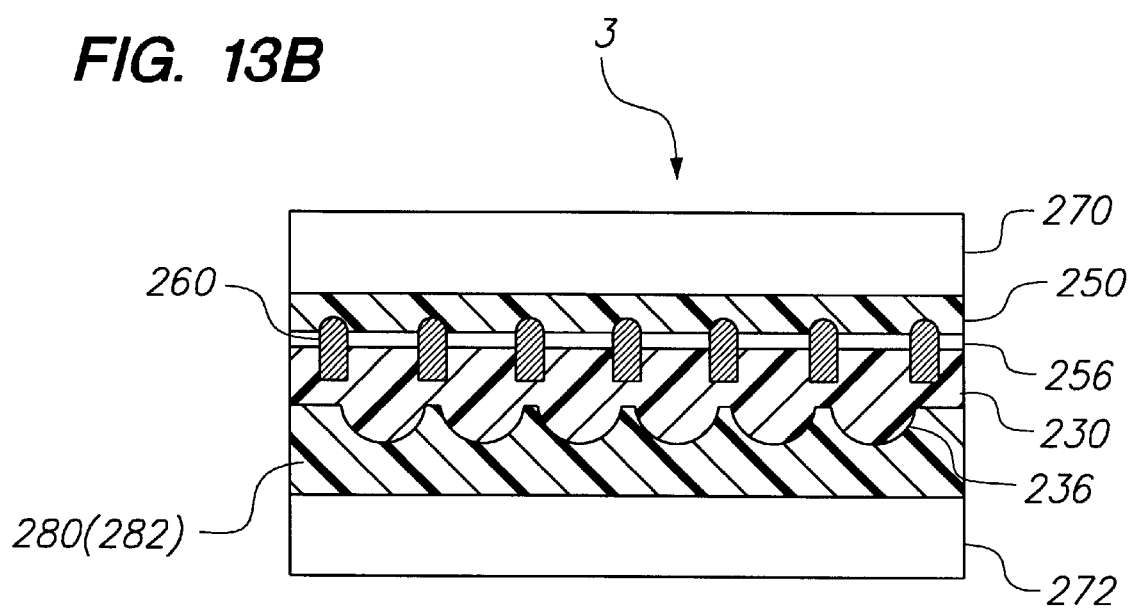

A third light transmitting layer 280 is thus formed between the reinforcing layer 272 and light transmitting layer 230 as shown in FIG. 13B, and a microlens array (optical substrate) 3 according to the present invention is achieved.

It will be obvious to one with ordinary skill in the related art that if the mechanical strength, gas barrier properties, chemical resistance, and other properties required for the microlens array can be achieved with the second and third light transmitting layers 250 and 280 alone, the corresponding reinforcing layers 270 and 272 can be removed. In addition, the second and third light transmitting layers 250 and 280 can also be omitted if the first light transmitting layer 230 alone has sufficient mechanical strength and the light shield layer 260 will not be damaged.

Furthermore, the light shield recesses 238 can be easily filled with light shield material 262 in this preferred embodiment of the present invention by forming top layer 256 on light transmitting layer 230.

A light transmitting layer 230 having a plurality of lenses 236 can also be easily produced using a simple transfer molding process with this preferred embodiment of the present invention. Material is also used very efficiently, and the number of process steps can be reduced, using this exemplary manufacturing method.

Furthermore, once manufactured, the first and second masters 210 and 220 can be reused multiple times insofar as their durability allows. The steps for producing the first and second masters 210 and 220 can therefore be eliminated from the manufacturing process used with second and subsequent microlens arrays. The number of steps involved with microlens array manufacture can thus be reduced, and the unit cost can therefore be further reduced compared with conventional microlens arrays.

It is to be further noted that in this exemplary microlens array, according to the present invention, light shield recesses 238 are transfer molded from the raised parts 218 of the first master 210, and the resulting light shield recesses 238 are then filled with a light shield material 262. The light shield layer 260 formed from this light shield material 262 forms a black matrix, making it possible to improve contrast between pixels.

It is therefore possible, with the manufacturing method according to this preferred embodiment of the present invention, to easily manufacture with a transfer molding process a microlens array in which screen brightness can be increased and contrast can also be improved.

Embodiment 4

A method of manufacturing a microlens array according to a fourth preferred embodiment of the present invention is described next with reference to FIG. 14A to FIG. 16B.

The first step in this exemplary manufacturing method is to prepare a first master 310 having a plurality of light shield recesses 318 formed in a surface thereof with a top layer 300 formed on the same surface of the first master 310. When seen in a plan view (not shown in the figures), these recessed parts 318 form a black matrix pattern.

The top layer 300 is a material that repels the light shield material 362 that will fill the light shield recesses 318. Any of the materials and methods used for the top layer 100 in the above second embodiment can be used for this top layer 300.

The light shield recesses 318 in this first master 310 are then filled with a light shield material 362 to form the light shield layer 360. This light shield layer 360 becomes a black matrix. Any of the materials and methods used for the light shield material in the above first embodiment can be used for this light shield material 362. This filling step is completed when the light shield material 362 has been filled uniformly throughout the light shield recesses 318.

The first master 310 is then pressed together with a second master 320 with a first light transmitting layer precursor 332 disposed therebetween.

This second master 320 has a plurality of curved parts 328 formed on the surface of the master. These curved parts 328 are convex with a surface profile that is the inverse of the surface profile of the concave lenses to be transferred from the curved parts 328.

The light transmitting layer precursor 332 can be made using any of the materials used for the light transmitting layer precursor 32 described above with reference to the first embodiment of the invention. The method of pressing the first and second masters 310 and 320 together can also be any of the methods described in the above first embodiment. It should be further noted that while the first master 310 is shown on the bottom in FIG. 14B, the second master 320 can alternatively be placed on the bottom for this step.

Figure 14A:
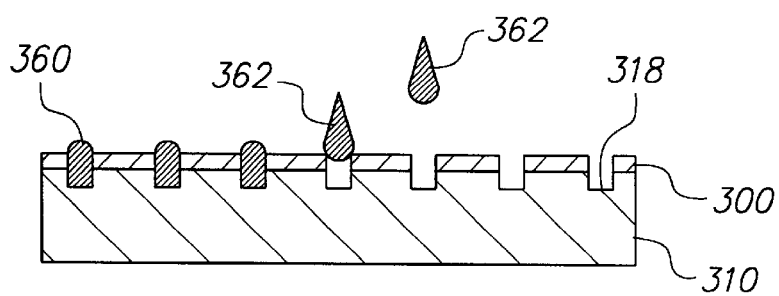
FIG. 14A to FIG. 16C show various steps in a microlens array manufacturing method according to a fourth preferred embodiment of the present invention.
Figure 14B:
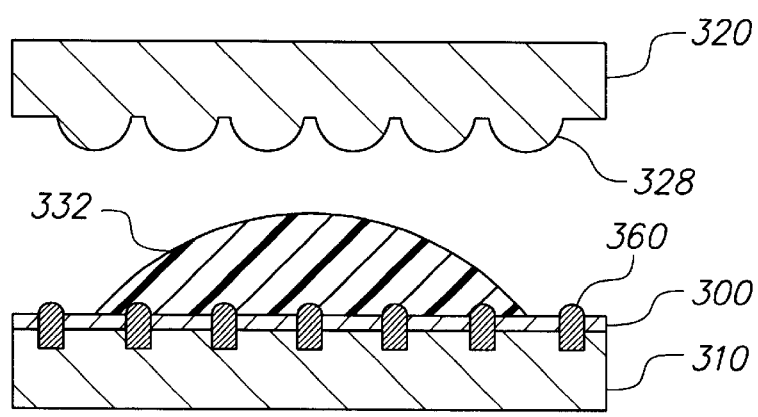
Figure 14C:
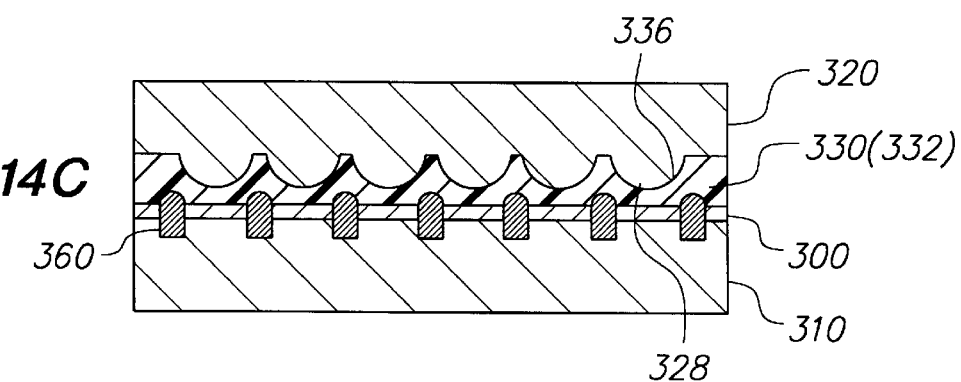

The first light transmitting layer precursor 332 is thus spread to cover a specific area between the masters as shown in FIG. 14C to form a first light transmitting layer 330. To spread the light transmitting layer precursor 332 to cover the specific area, a specified pressure can be applied as required to either or both the masters 310 and 320.

The light transmitting layer precursor 332 is then exposed to a specific amount of radiation through either or both master 310 and 320 to set the light transmitting layer 330.

Figure 15A:
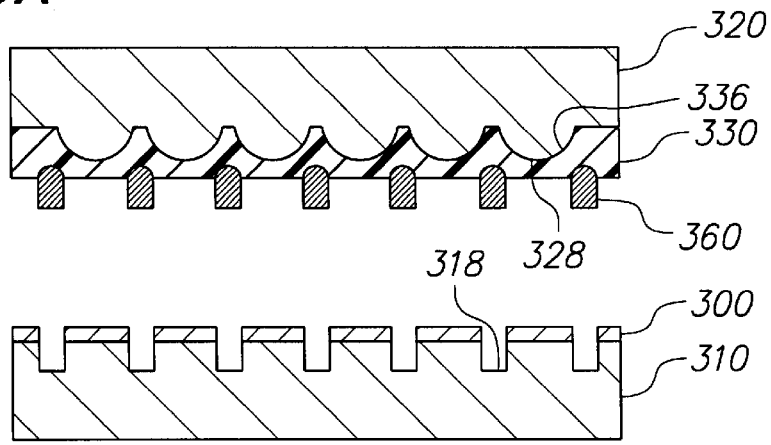

The shape of the curved parts 328 in the second master 320 is thus transferred to the first light transmitting layer 330 to form lenses 336 (FIG. 15A).

Figure 15B:
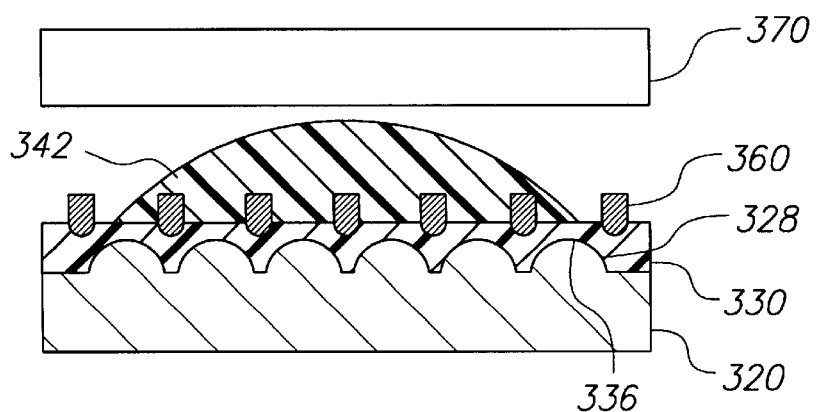
Figure 15C:
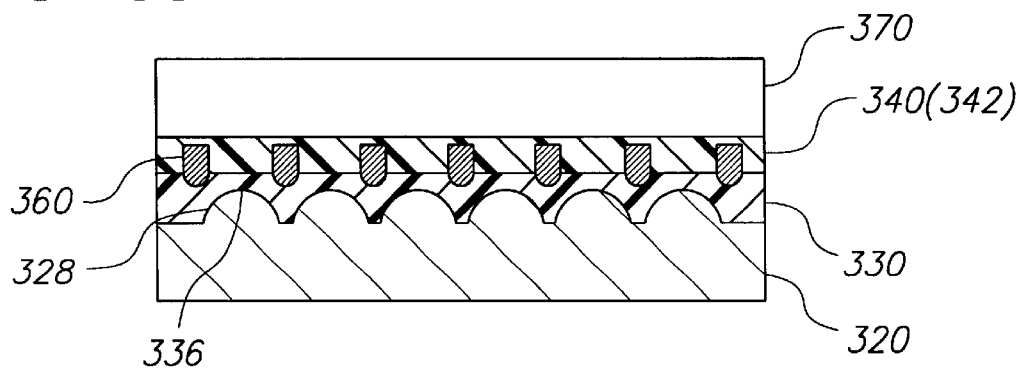

As shown in FIG. 15A, the first master 310 is then separated from the light transmitting layer 330 and light shield layer 360. The first light transmitting layer 330 is then pressed together with a reinforcing layer 370 with a second light transmitting layer precursor 342 disposed therebetween as shown in FIG. 15B to form a second light transmitting layer 340 as shown in FIG. 15C.

Figure 16A:
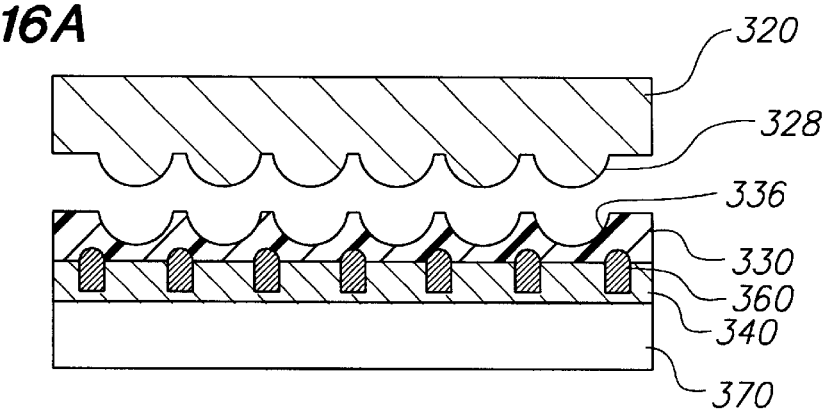
Figure 16B:
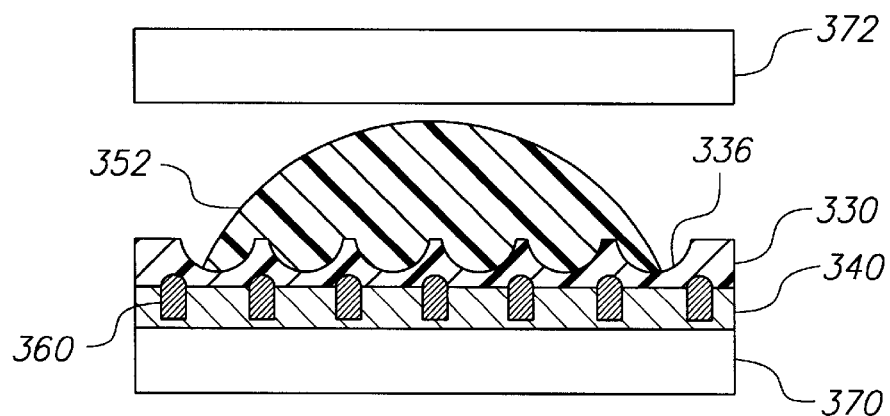

The second master 320 is then separated from the first light transmitting layer 330 as shown in FIG. 16A. The first light transmitting layer 330 is then pressed together with a reinforcing layer 372 with a third light transmitting layer precursor 352 disposed therebetween as shown in FIG. 16B to form a third light transmitting layer 350 as shown in FIG. 16C.

It should be noted that any of the materials used for the light transmitting layer precursor 32 in the above first embodiment can be used for the second and third light transmitting layer precursors 342 and 352 of this present embodiment, and the precursors 342 and 352 can be spread and set using the methods also described in the above first embodiment.

Figure 16C:
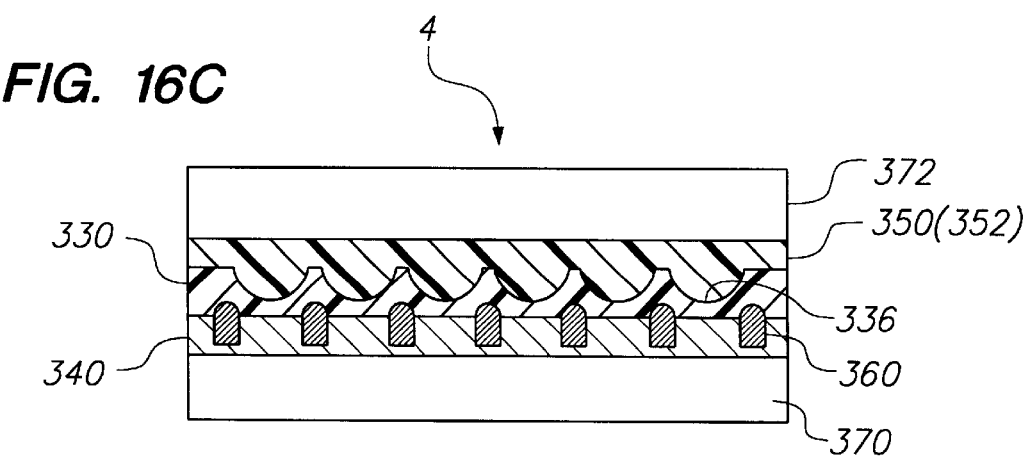

A microlens array (optical substrate) 4 as shown in FIG. 16C is thus achieved. As shown in FIG. 16C this microlens array 4 comprises first to third light transmitting layers 330, 340, and 350 disposed between first and second reinforcing layers 370 and 372. A light shield layer 360 forming a black matrix is further disposed between the first and second light transmitting layers 330 and 340, and lenses 336 are formed on the surface of the first light transmitting layer 330 opposite the surface having the light shield layer 360. A third light transmitting layer 350 is further formed on top of the lenses 336, which can be alternatively seen as being formed in the third light transmitting layer 350.

It will be obvious to one with ordinary skill in the related art that if the mechanical strength, gas barrier properties, chemical resistance, and other properties required for the microlens array can be achieved with the second and third light transmitting layers 340 and 350 alone, the corresponding reinforcing layers 370 and 372 can be removed. In addition, the second and third light transmitting layers 340 and 350 can also be omitted if the first light transmitting layer 330 alone has sufficient mechanical strength and the light shield layer 360 will not be damaged.

Furthermore, the light shield recesses 318 can be easily filled with light shield material 362 to in this preferred embodiment of the present invention by forming top layer 300 on first master 310.

Other effects and benefits of this fourth preferred embodiment of the present invention are the same as those of the above third embodiment.

Figure 17:
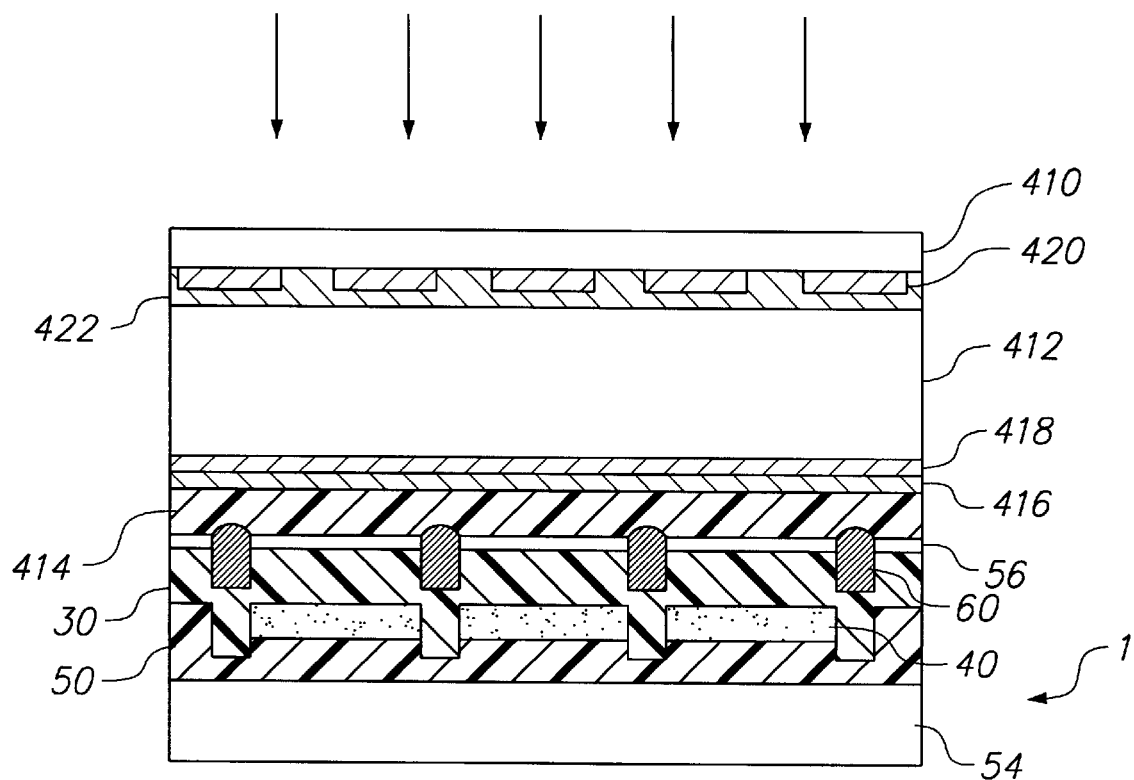
FIG. 17 is a section view of a color LCD panel comprising a color filter manufactured using a method according to a preferred embodiment of the present invention.

FIG. 17 is a section view of a thin film transistor (TFT) color LCD panel comprising a color filter 1 manufactured by a method according to the first preferred embodiment of the present invention. This color LCD panel comprises the color filter 1 and a glass panel 410 opposite the color filter 1 with a liquid crystal material 412 sealed therebetween. A protective light transmitting layer 414, common electrode 416, and orientation film 418 are further laminated to the top layer 56 of the color filter 1.

A transparent pixel electrode 420 and orientation film 422 are further laminated to the inside of the glass panel 410.

A color display can thus be achieved by emitting a backlight to this LCD panel and driving the liquid crystal material 412 to function as an optical shutter varying backlight transmittance.

Figure 18:
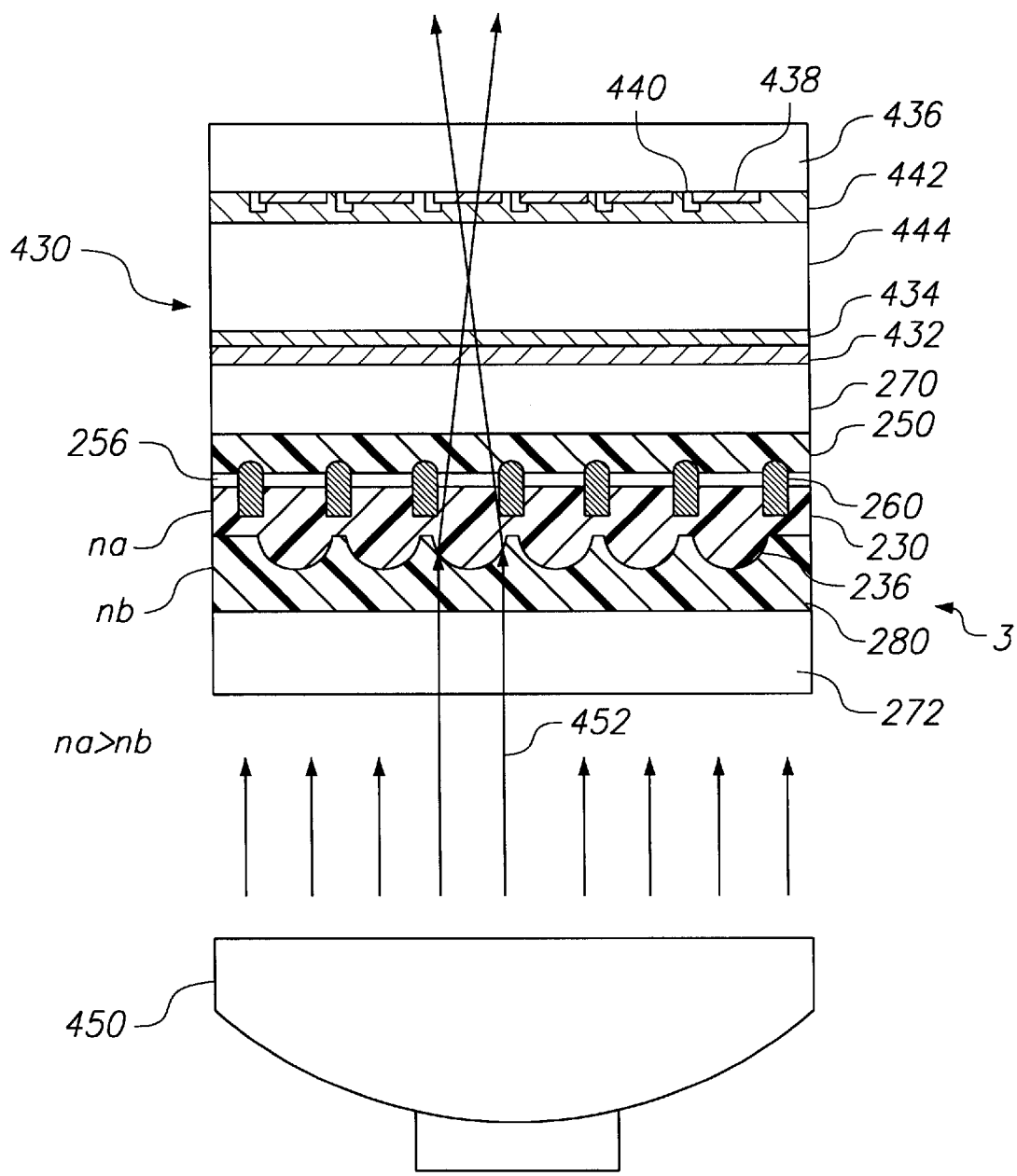
FIG. 18 shows a LCD projector comprising a microlens array manufactured using a method according to a preferred embodiment of the present invention.

FIG. 18 shows part of an LCD projector using a microlens array 3 according to the present invention. More specifically, the light valve 430 of this LCD projector comprises a microlens array 3 manufactured using a method according to the above third embodiment of the invention. Lamp 450 is the light source.

The surface of the microlens array 3 in which the lenses 236 of the light transmitting layer 230 are formed is positioned facing the lamp 450. A common electrode 432 and orientation film 434 are laminated to the reinforcing layer 270 over the light shield layer 260 forming a black matrix.

A TFT layer 436 is disposed to the light valve 430 with a gap between the TFT layer 436 and orientation film 434. The TFT layer 436 comprises transparent individual electrodes 438 and TFT 440 covered by an orientation film 442. The TFT layer 436 is disposed with the orientation film 442 opposite orientation film 434.

Liquid crystal 444 is sealed between orientation films 434 and 442, and is driven by a voltage controlled by the TFT 440.

The refractive index na of the light transmitting layer 230 and the refractive index nb of the light transmitting layer 280 positioned outside the lenses 236 must be in the relationship na>nb. By satisfying this condition, light is incident from a medium with a low refractive index to a medium with a high refractive index. Light 452 is therefore refracted and converged to a line approximately normal to the interface between the two media. A bright screen can therefore be achieved.

With an LCD projector thus comprised, light 452 emitted from the lamp 450 is converged by each lens 236 onto a single pixel, thereby achieving a bright display. The light shield layer 260 also functions as a black matrix so that contrast between pixels can be improved.

Figure 19:
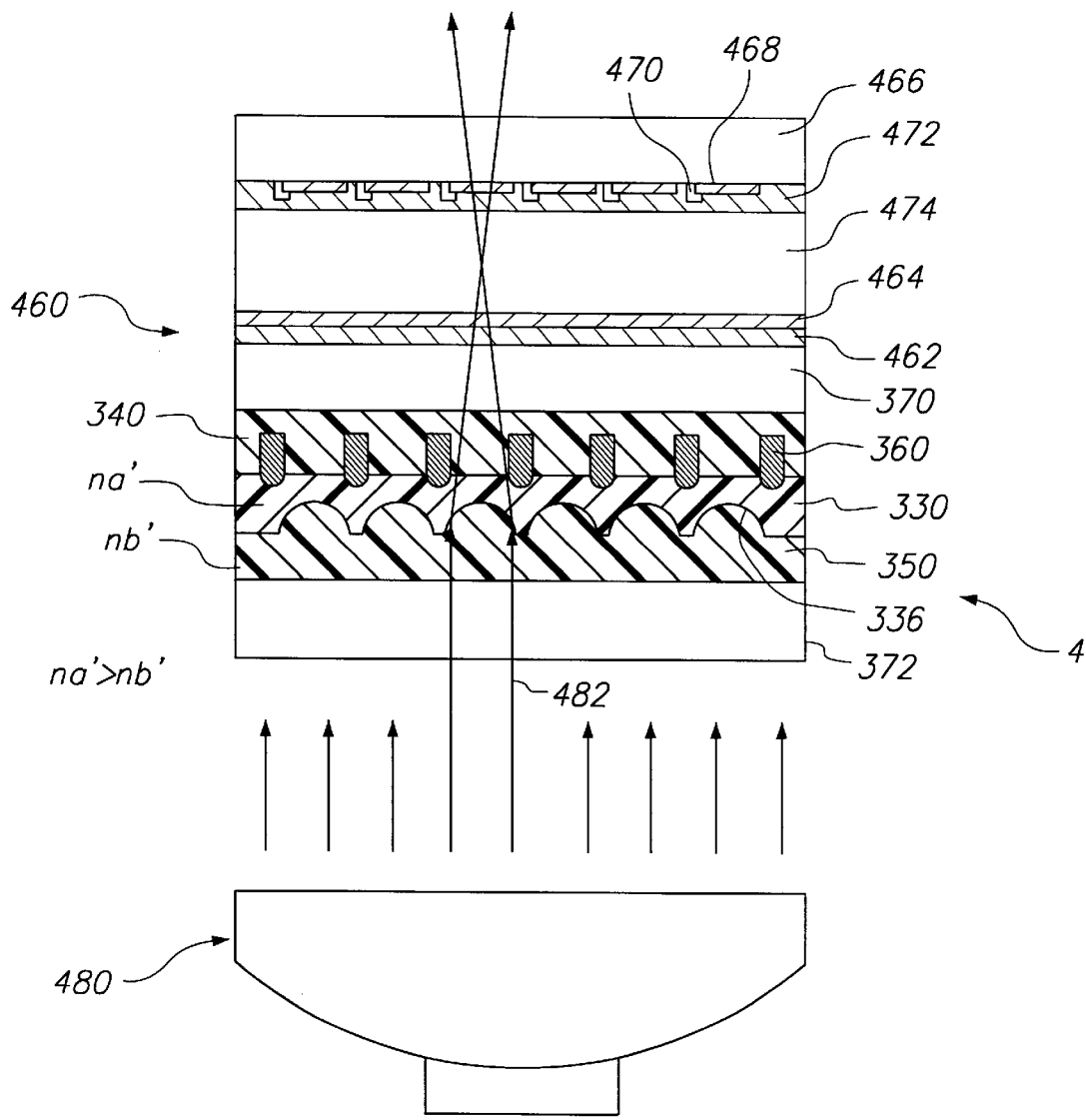
FIG. 19 shows a LCD projector comprising a microlens array manufactured using another method according to a preferred embodiment of the present invention.

FIG. 19 shows part of an LCD projector using a microlens array 4 according to the present invention. More specifically, the light valve 460 of this LCD projector comprises a microlens array 4 manufactured using a method according to the above fourth embodiment of the invention. Lamp 480 is the light source.

The surface of the microlens array 4 in which the light shield layer 360 of the light transmitting layer 330 is formed is positioned on the side away from the lamp 480. A common electrode 462 and orientation film 464 are laminated to the reinforcing layer 370 over the light shield layer 360 forming a black matrix.

A TFT layer 466 is disposed to the light valve 460 with a gap between the TFT layer 466 and orientation film 464. The TFT layer 466 comprises transparent individual electrodes 468 and TFT 470 covered by an orientation film 472. The TFT layer 466 is disposed with the orientation film 472 opposite orientation film 464.

Liquid crystal 474 is sealed between orientation films 464 and 472, and is driven by a voltage controlled by the TFT 470.

The refractive index na' of the light transmitting layer 330 and the refractive index nb' of the light transmitting layer 350 positioned outside the lenses 336 must be in the relationship na'<nb' in this case. By satisfying this condition, light is incident from a medium with a high refractive index to a medium with a low refractive index. Light 482 is therefore refracted and converged away from a line normal to the interface between the two media. A bright screen can therefore be achieved.

With an LCD projector thus comprised, light 482 emitted from the lamp 480 is converged by each lens 336 onto a single pixel, thereby achieving a bright display. The light shield layer 360 also functions as a black matrix so that contrast between pixels can be improved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of manufacturing an optical substrate, comprising:

pressing tightly together, with a light transmitting layer precursor disposed therebetween, a first master having a plurality of first raised parts dividing a plurality of areas, and a second master having a plurality of second raised parts divided by a plurality of channels, to form a light transmitting layer having a plurality of light shield recesses transferred from a surface profile of said first raised parts, and a plurality of color recesses transferred from a surface profile of said second raised parts;

separating said first master from said light transmitting layer;

forming, at least around openings to said light shield recesses, a layer for repelling a light shield material, and filling said light shield material into said light shield recesses to form a light shield layer;

separating said second master from said light transmitting layer; and filling a color material into said color recesses to form a color pattern layer.

2. An optical substrate manufactured according to the method of claim 1.

3. A method of manufacturing an optical substrate, comprising:

pressing tightly together, with a light transmitting layer precursor disposed therebetween, a first master having a plurality of raised parts dividing a plurality of areas, and a second master having a plurality of curved parts, to form a light transmitting layer having a plurality of light shield recesses transferred from a surface profile of said raised parts, and a plurality of lenses transferred from a surface profile of said curved parts;

separating said first master from said light transmitting layer;

forming, at least around openings to said light shield recesses, a layer for repelling a light shield material, and filling said light shield material into said light shield recesses to form a light shield layer.

4. An optical substrate manufactured according to the method of claim 3.

5. A method of manufacturing an optical substrate, comprising:

filling a plurality of light shield recesses in a first master with a light shield material to form a light shield layer; said first master having a plurality of light shield recesses dividing a plurality of areas, and a top layer formed at least around openings into said light shield recesses for repelling a light shield material;

pressing tightly together, with a light transmitting layer precursor disposed therebetween, a second master and said first master having said light shield layer formed thereon, to form a light transmitting layer;

separating said first master from said light transmitting layer and said light shield layer to form a plurality of color recesses integrated with said light shield layer; and filling a color material into said color recesses to form a color pattern layer.

6. The optical substrate manufacturing method as set forth in claim 5, wherein said color recesses are separated from each other and formed by said light shield layer.

7. The optical substrate manufacturing method as set forth in claim 5, wherein said first master has strong affinity with said light shield material.

8. The optical substrate manufacturing method as set forth in claim 5, including forming a metal base layer on a first master substrate, and self-assembling a sulfur compound on said metal base layer to form said top layer on said first master.

9. The optical substrate manufacturing method as set forth in claim 5, wherein said light shield material is hydrophilic, and said top layer is water repellent.

10. The optical substrate manufacturing method as set forth in claim 5, wherein said light shield material is water repellent, and said top layer is hydrophilic.

11. An optical substrate manufactured according to the method of claim 5.

12. A method of manufacturing an optical substrate, comprising:

filling a plurality of light shield recesses in a first master with a light shield material to form a light shield layer, said first master having a plurality of light shield recesses dividing a plurality of areas, and a top layer formed at least around openings into said light shield recesses for repelling a light shield material;

pressing tightly together, with a light transmitting layer precursor disposed therebetween, a second master having a plurality of curved parts and said first master having said light shield layer formed thereon, to form a light transmitting layer having a plurality of lenses integrated with said light shield layer;

separating said first master from said light transmitting layer and said light shield layer; and separating said second master from said light transmitting layer.

13. The optical substrate manufacturing method as set forth in claim 12, wherein said first master has strong affinity with said light shield material.

14. The optical substrate manufacturing method as set forth in claim 12, including forming a metal base layer on a first master substrate, and self assembling a sulfur compound on said metal base layer to form said top layer on said first master.

15. The optical substrate manufacturing method as set forth in claim 12, wherein said light shield material is hydrophilic, and said top layer is water repellent.

16. The optical substrate manufacturing method as set forth in claim 12, wherein said light shield material is water repellent, and said top layer is hydrophilic.

17. An optical substrate manufactured according to the method of claim 12.

18. An optical substrate comprising:

a light transmitting layer having a plurality of light shield recesses dividing a plurality of areas formed on one surface thereof, and a plurality of color recesses corresponding to said areas divided by said light shield recesses formed on an opposite surface of said light transmitting layer;

a light shield layer formed with a light shield material filled into said light shield recesses;

a top layer formed at least around openings into said light shield recesses for repelling said light shield material; and a color pattern layer formed with a color material filled into said color recesses.

19. An optical substrate comprising:

a light transmitting layer having a plurality of light shield recesses dividing a plurality of areas formed on one surface thereof, and a plurality of lenses corresponding to said areas divided by said light shield recesses formed on an opposite surface of said light transmitting layer;

a light shield layer formed with a light shield material filled into said light shield recesses; and a top formed at least around openings into said light shield recesses for repelling said light shield material.

20. A display device comprising:

an optical substrate comprising:

a light transmitting layer having a plurality of light shield recesses dividing a plurality of areas formed on one surface thereof, and a plurality of color recesses corresponding to said areas divided by said light shield recesses formed on an opposite surface of said light transmitting layer;

a light shield layer formed with a light shield material filled into said light shield recesses;

a top layer formed at least around openings into said light shield recesses for repelling said light shield material; and a color pattern layer formed with a color material filled into said color recesses; and a light source for emitting light to said optical substrate.

21. A display device comprising:

an optical substrate comprising:

a light transmitting layer having a plurality of light shield recesses dividing a plurality of areas formed on one surface thereof, and a plurality of lenses corresponding to said areas divided by said light shield recesses formed on an opposite surface of said light transmitting layer;

a light shield layer formed with a light shield material filled into said light shield recesses; and a top formed at least around openings into said light shield recesses for repelling said light shield material; and a light source for emitting light to said optical substrate.

* * * * *